US012613919B2

(12) United States Patent
Ayed et al.

(10) Patent No.: US 12,613,919 B2
(45) Date of Patent: Apr. 28, 2026

(54) ERROR CORRECTING OF PROGRAMMING CODE GENERATED THROUGH INTEGRATION WITH GENERATIVE ARTIFICIAL INTELLIGENCE

(71) Applicant: Splunk Inc., San Francisco, CA (US)

(72) Inventors: Khalil Ben Ayed, Vancouver (CA); Leo Betthauser, Kirkland, WA (US); Longbin Chen, Bellevue, WA (US); Mahan Das, San Jose, CA (US); Vedant Dharnidharka, Jersey City, NJ (US); Haydn John Wiese, Fremont, CA (US); Rong Tan Wang, Santa Clara, CA (US); Seunghee Han, Santa Clara, CA (US); Julien Didier Jean Veron Vialard, Stanford, CA (US)

(73) Assignee: Cisco Technology, Inc., San Jose, CA (US)

( * ) Notice: Subject to any disclaimer, the term of this patent is extended or adjusted under 35 U.S.C. 154(b) by 149 days.

(21) Appl. No.: 18/739,304

(22) Filed: Jun. 10, 2024

(65) Prior Publication Data

US 2025/0245425 A1 Jul. 31, 2025

Related U.S. Application Data

(60) Provisional application No. 63/627,797, filed on Jan. 31, 2024.

(51) Int. Cl.
*G06F 40/40* (2020.01)
*G06F 8/20* (2018.01)
(Continued)

(52) U.S. Cl.
CPC .......... *G06F 16/90332* (2019.01); *G06F 8/20* (2013.01); *G06F 8/35* (2013.01);
(Continued)

(58) Field of Classification Search
CPC ........ G06F 16/90332; G06F 8/20; G06F 8/35; G06F 8/38; G06F 16/9038; G06F 40/137; G06F 40/186; G06F 40/284; G06F 40/40
See application file for complete search history.

(56) References Cited

U.S. PATENT DOCUMENTS 7,937,344 B2 5/2011 Baum et al.
8,112,425 B2 2/2012 Baum et al.
(Continued)

FOREIGN PATENT DOCUMENTS

WO 2022159196 A1 7/2022

OTHER PUBLICATIONS

International Search Report and Written Opinion for International Application No. PCT/US2024/039943, dated Dec. 5, 2024, 11 Pages.
(Continued)

*Primary Examiner* — Douglas Godbold
(74) *Attorney, Agent, or Firm* — Rutan & Tucker, LLP; Kyle M. St. James

(57) ABSTRACT

Disclosed herein are systems and methods for improving the auto-generation of pipelined search query statements by a large language model (LLM) through a post processing. In some examples, such a method includes operations of receiving, by a post processing engine, a response to an auto-generated prompt from the LLM that includes programming code generated by the LLM, performing a post processing of a response from the LLM that includes the programming code generated by the LLM including performing an error correction process when a term of the programming code generated by the LLM is inconsistent with terms of a schema of the user, and generating a graphical user interface (GUI) that displays the response to the auto-generated prompt when the terms of the program-
(Continued)

ming code generated by the LLM including any replacement terms are consistent with the terms of the schema.

20 Claims, 19 Drawing Sheets

(51) Int. Cl.

| | |
|---|---|
| *G06F 8/35* | (2018.01) |
| *G06F 8/38* | (2018.01) |
| *G06F 16/9032* | (2019.01) |
| *G06F 16/9038* | (2019.01) |
| *G06F 40/137* | (2020.01) |
| *G06F 40/186* | (2020.01) |
| *G06F 40/284* | (2020.01) |

(52) U.S. Cl.
CPC ............ *G06F 8/38* (2013.01); *G06F 16/9038* (2019.01); *G06F 40/137* (2020.01); *G06F 40/186* (2020.01); *G06F 40/284* (2020.01); *G06F 40/40* (2020.01)

(56) References Cited

U.S. PATENT DOCUMENTS

| | | | | |
|---|---|---|---|---|
| 8,751,529 | B2 | 6/2014 | Zhang et al. | |
| 8,788,525 | B2 | 7/2014 | Neels et al. | |
| 9,215,240 | B2 | 12/2015 | Merza et al. | |
| 9,286,413 | B1 | 3/2016 | Coates et al. | |
| 10,127,258 | B2 | 11/2018 | Lamas et al. | |
| 10,546,001 | B1 | 1/2020 | Nguyen et al. | |
| 11,074,250 | B2 | 7/2021 | Flaks | |
| 11,113,294 | B1 | 9/2021 | Bourbie et al. | |
| 12,253,932 | B1 * | 3/2025 | Schumacher | G06F 11/3438 |
| 12,277,409 | B1 * | 4/2025 | Leeman-Munk | G06F 8/35 |
| 2019/0098106 | A1 | 3/2019 | Mungel et al. | |
| 2024/0319970 | A1 * | 9/2024 | Watson | G06F 8/35 |
| 2024/0378399 | A1 * | 11/2024 | Gandhi | G06F 40/40 |
| 2025/0004915 | A1 * | 1/2025 | Rudenko | G06F 11/3604 |
| 2025/0013893 | A1 | 1/2025 | Raymond et al. | |
| 2025/0045027 | A1 * | 2/2025 | Ngiam | G06F 11/3698 |
| 2025/0086171 | A1 * | 3/2025 | Kunz | G06F 40/40 |
| 2025/0232169 | A1 * | 7/2025 | Bansal | G06N 5/01 |

OTHER PUBLICATIONS

L. M. Betthauser, et. al. "Generation of Latent Representation Graph from Decoder Model Inferencing and Selection of a Tool by a Graph Neural Network Based on the Latent Representation Graph," filed Oct. 24, 2024, U.S. Appl. No. 18/926,200 including its prosecution history.

L. M. Betthauser, et. al. "Generation of Latent Representation Graph from Semantic Embeddings of Prompt Substrings and Prompt Substring Relationships," filed Oct. 24, 2024, U.S. Appl. No. 18/926,202 including its prosecution history.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

K. B. Ayed, et. al. "Systems and Methods for Automated Generation of Programming Code Through Integration with Generative Artificial Intelligence," filed Jun. 10, 2024, U.S. Appl. No. 18/739,297 including its prosecution history.

K. B. Ayed, et. al. "Systems and Methods for Sequential Retrieval Augmented Generation," filed Jun. 10, 2024, U.S. Appl. No. 18/739,299 including its prosecution history.

* cited by examiner

Figure 3:
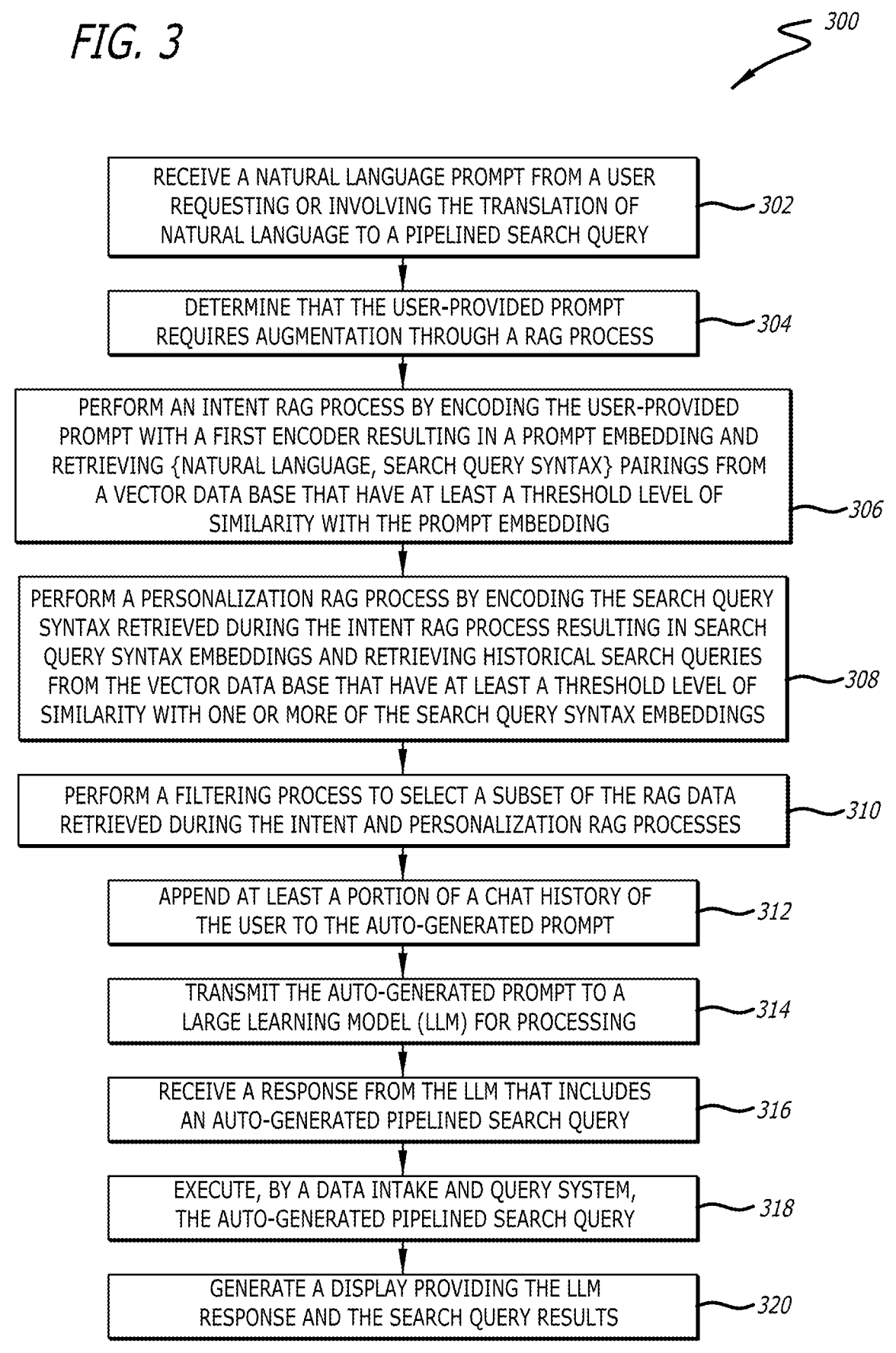

RECEIVE A NATURAL LANGUAGE PROMPT FROM A USER REQUESTING OR INVOLVING THE TRANSLATION OF NATURAL LANGUAGE TO A PIPELINED SEARCH QUERY —302

DETERMINE THAT THE USER-PROVIDED PROMPT REQUIRES AUGMENTATION THROUGH A RAG PROCESS —304

PERFORM AN INTENT RAG PROCESS BY ENCODING THE USER-PROVIDED PROMPT WITH A FIRST ENCODER RESULTING IN A PROMPT EMBEDDING AND RETRIEVING {NATURAL LANGUAGE, SEARCH QUERY SYNTAX} PAIRINGS FROM A VECTOR DATA BASE THAT HAVE AT LEAST A THRESHOLD LEVEL OF SIMILARITY WITH THE PROMPT EMBEDDING —306

PERFORM A PERSONALIZATION RAG PROCESS BY ENCODING THE SEARCH QUERY SYNTAX RETRIEVED DURING THE INTENT RAG PROCESS RESULTING IN SEARCH QUERY SYNTAX EMBEDDINGS AND RETRIEVING HISTORICAL SEARCH QUERIES FROM THE VECTOR DATA BASE THAT HAVE AT LEAST A THRESHOLD LEVEL OF SIMILARITY WITH ONE OR MORE OF THE SEARCH QUERY SYNTAX EMBEDDINGS —308

PERFORM A FILTERING PROCESS TO SELECT A SUBSET OF THE RAG DATA RETRIEVED DURING THE INTENT AND PERSONALIZATION RAG PROCESSES —310

APPEND AT LEAST A PORTION OF A CHAT HISTORY OF THE USER TO THE AUTO-GENERATED PROMPT —312

TRANSMIT THE AUTO-GENERATED PROMPT TO A LARGE LEARNING MODEL (LLM) FOR PROCESSING —314

RECEIVE A RESPONSE FROM THE LLM THAT INCLUDES AN AUTO-GENERATED PIPELINED SEARCH QUERY —316

EXECUTE, BY A DATA INTAKE AND QUERY SYSTEM, THE AUTO-GENERATED PIPELINED SEARCH QUERY —318

GENERATE A DISPLAY PROVIDING THE LLM RESPONSE AND THE SEARCH QUERY RESULTS —320

Figure 6:
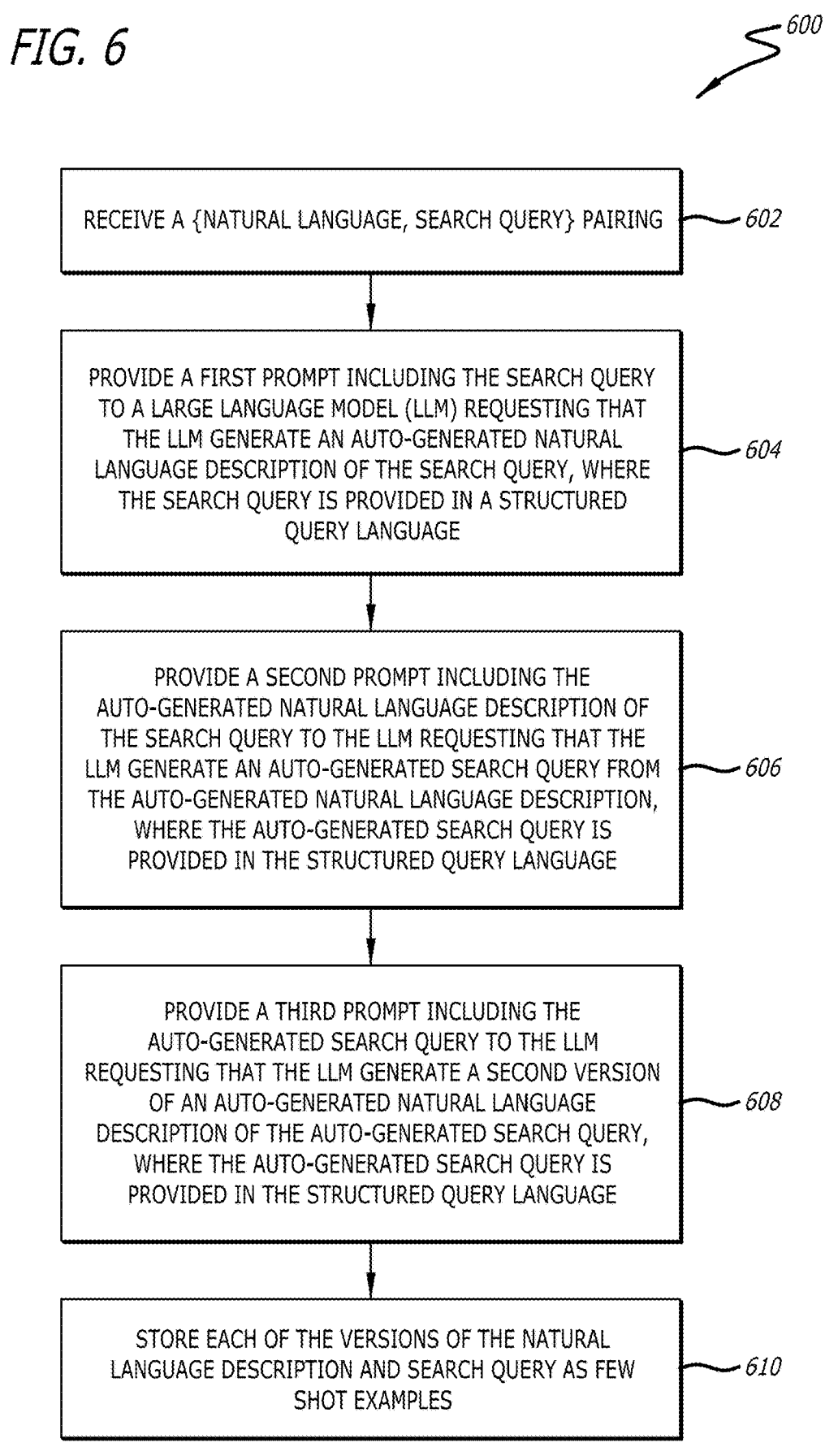

```
┌─────────────────────────────────────────┐
│ RECEIVE A {NATURAL LANGUAGE, SEARCH      │── 602
│ QUERY} PAIRING                           │
└─────────────────────────────────────────┘
                    │
                    ▼
┌─────────────────────────────────────────┐
│ PROVIDE A FIRST PROMPT INCLUDING THE     │
│ SEARCH QUERY TO A LARGE LANGUAGE MODEL   │
│ (LLM) REQUESTING THAT THE LLM GENERATE   │── 604
│ AN AUTO-GENERATED NATURAL LANGUAGE       │
│ DESCRIPTION OF THE SEARCH QUERY, WHERE   │
│ THE SEARCH QUERY IS PROVIDED IN A        │
│ STRUCTURED QUERY LANGUAGE                │
└─────────────────────────────────────────┘
                    │
                    ▼
┌─────────────────────────────────────────┐
│ PROVIDE A SECOND PROMPT INCLUDING THE    │
│ AUTO-GENERATED NATURAL LANGUAGE          │
│ DESCRIPTION OF THE SEARCH QUERY TO THE   │
│ LLM REQUESTING THAT THE LLM GENERATE AN  │── 606
│ AUTO-GENERATED SEARCH QUERY FROM THE     │
│ AUTO-GENERATED NATURAL LANGUAGE          │
│ DESCRIPTION, WHERE THE AUTO-GENERATED    │
│ SEARCH QUERY IS PROVIDED IN THE          │
│ STRUCTURED QUERY LANGUAGE                │
└─────────────────────────────────────────┘
                    │
                    ▼
┌─────────────────────────────────────────┐
│ PROVIDE A THIRD PROMPT INCLUDING THE     │
│ AUTO-GENERATED SEARCH QUERY TO THE LLM   │
│ REQUESTING THAT THE LLM GENERATE A       │
│ SECOND VERSION OF AN AUTO-GENERATED      │── 608
│ NATURAL LANGUAGE DESCRIPTION OF THE      │
│ AUTO-GENERATED SEARCH QUERY, WHERE THE   │
│ AUTO-GENERATED SEARCH QUERY IS PROVIDED  │
│ IN THE STRUCTURED QUERY LANGUAGE         │
└─────────────────────────────────────────┘
                    │
                    ▼
┌─────────────────────────────────────────┐
│ STORE EACH OF THE VERSIONS OF THE        │
│ NATURAL LANGUAGE DESCRIPTION AND SEARCH  │── 610
│ QUERY AS FEW SHOT EXAMPLES               │
└─────────────────────────────────────────┘
```

File  Edit  View  Favorite  Tools  Help

Back ▾ | Search | Favorites

Write SPL | Explain SPL | Tell me about...

Chat

② Usage guidelines

⚙ Settings

902 can you write an SPL query to find the version of Python for Scientific Computing app I am using Yes, you can use the following SPL query to find the version of Python for Scientific Computing app you are using:

```
| rest /services/apps/local splunk_server=local
| search disabled=0 label="Python for Scientific Computing"
| table version
```

This query will return the version of the Python for Scientific Computing app installed on your Splunk instance.

> Related documentation 903    905    907

904

906

908

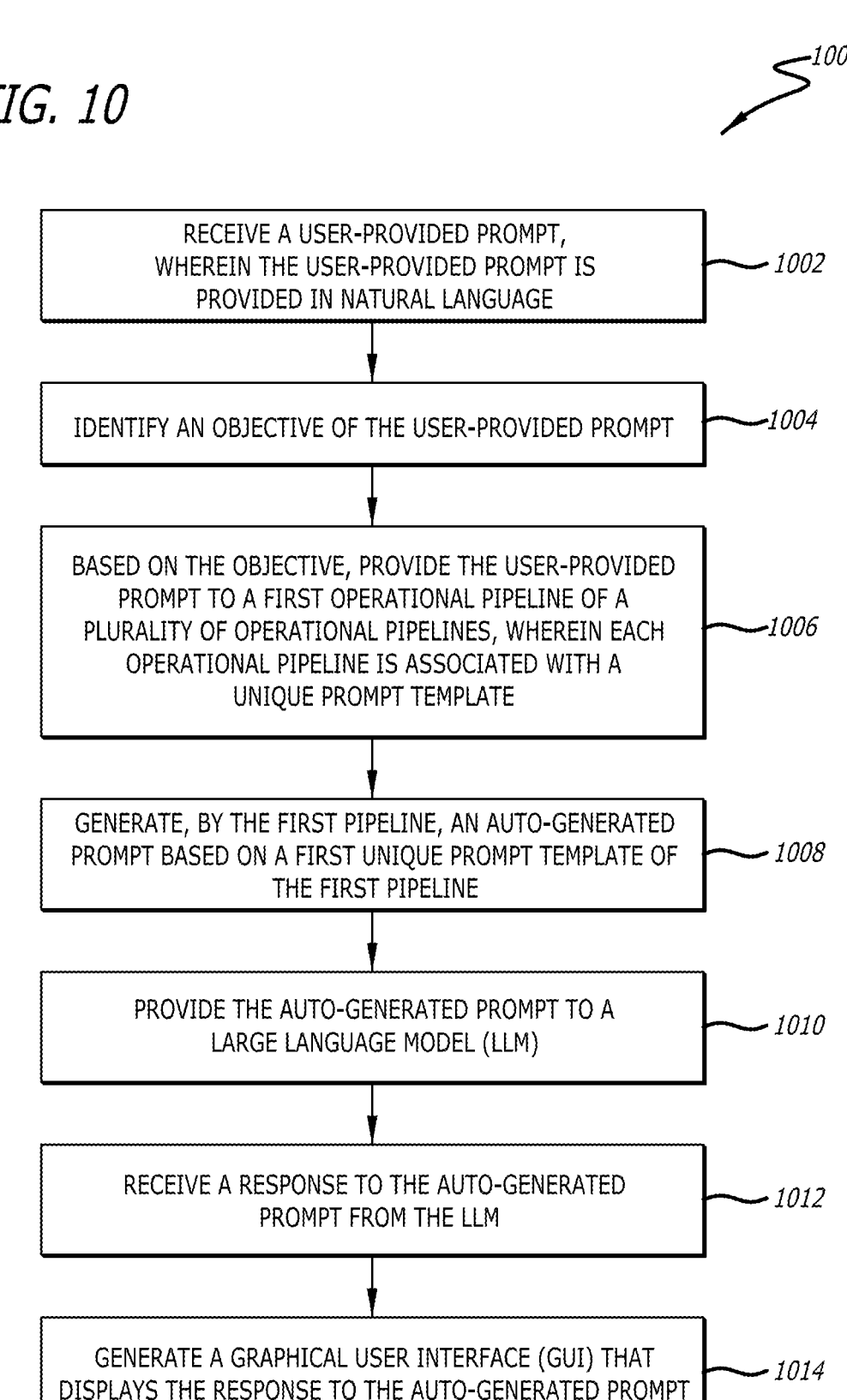

RECEIVE A USER-PROVIDED PROMPT, WHEREIN THE USER-PROVIDED PROMPT IS PROVIDED IN NATURAL LANGUAGE — 1002

IDENTIFY AN OBJECTIVE OF THE USER-PROVIDED PROMPT — 1004

BASED ON THE OBJECTIVE, PROVIDE THE USER-PROVIDED PROMPT TO A FIRST OPERATIONAL PIPELINE OF A PLURALITY OF OPERATIONAL PIPELINES, WHEREIN EACH OPERATIONAL PIPELINE IS ASSOCIATED WITH A UNIQUE PROMPT TEMPLATE — 1006

GENERATE, BY THE FIRST PIPELINE, AN AUTO-GENERATED PROMPT BASED ON A FIRST UNIQUE PROMPT TEMPLATE OF THE FIRST PIPELINE — 1008

PROVIDE THE AUTO-GENERATED PROMPT TO A LARGE LANGUAGE MODEL (LLM) — 1010

RECEIVE A RESPONSE TO THE AUTO-GENERATED PROMPT FROM THE LLM — 1012

GENERATE A GRAPHICAL USER INTERFACE (GUI) THAT DISPLAYS THE RESPONSE TO THE AUTO-GENERATED PROMPT — 1014

*FIG. 11*

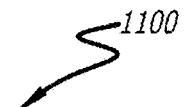

1100

| RECEIVE A USER-PROVIDED PROMPT, WHEREIN THE USER-PROVIDED PROMPT IS PROVIDED IN NATURAL LANGUAGE | ~1102 |

↓

| PERFORM A FIRST RETRIEVAL AUGMENTED GENERATION (RAG) PROCESS INCLUDING RETRIEVING FIRST RAG DATA INCLUDING {NATURAL LANGUAGE, PROGRAMMING SYNTAX} PAIRINGS FROM A VECTOR DATABASE THAT HAVE A FIRST LEVEL OF SIMILARITY WITH THE USER-PROVIDED PROMPT | ~1104 |

↓

| PERFORM A SECOND RAG PROCESS INCLUDING RETRIEVING SECOND RAG DATA INCLUDING ADDITIONAL PROGRAMMING SYNTAX EXAMPLES FROM A VECTOR DATABASE THAT HAVE A SECOND LEVEL OF SIMILARITY WITH PROGRAMMING SYNTAX OF THE {NATURAL LANGUAGE, PROGRAMMING SYNTAX} PAIRINGS RETRIEVED DURING THE FIRST RAG PROCESS | ~1106 |

↓

| GENERATE AN AUTO-GENERATED PROMPT BASED ON A FIRST UNIQUE PROMPT TEMPLATE CORRESPONDING TO A REQUEST FOR GENERATION OF PROGRAMMING CODE BY A LARGE LANGUAGE MODEL (LLM), WHEREIN THE AUTO-GENERATED PROMPT INCLUDES THE FIRST RAG DATA AND THE SECOND RAG DATA | ~1108 |

↓

| PROVIDE THE AUTO-GENERATED PROMPT TO THE LLM | ~1110 |

↓

| RECEIVE A RESPONSE TO THE AUTO-GENERATED PROMPT FROM THE LLM | ~1112 |

↓

| GENERATE A GRAPHICAL USER INTERFACE (GUI) THAT DISPLAYS THE RESPONSE TO THE AUTO-GENERATED PROMPT TO A USER | ~1114 |

FIG. 12

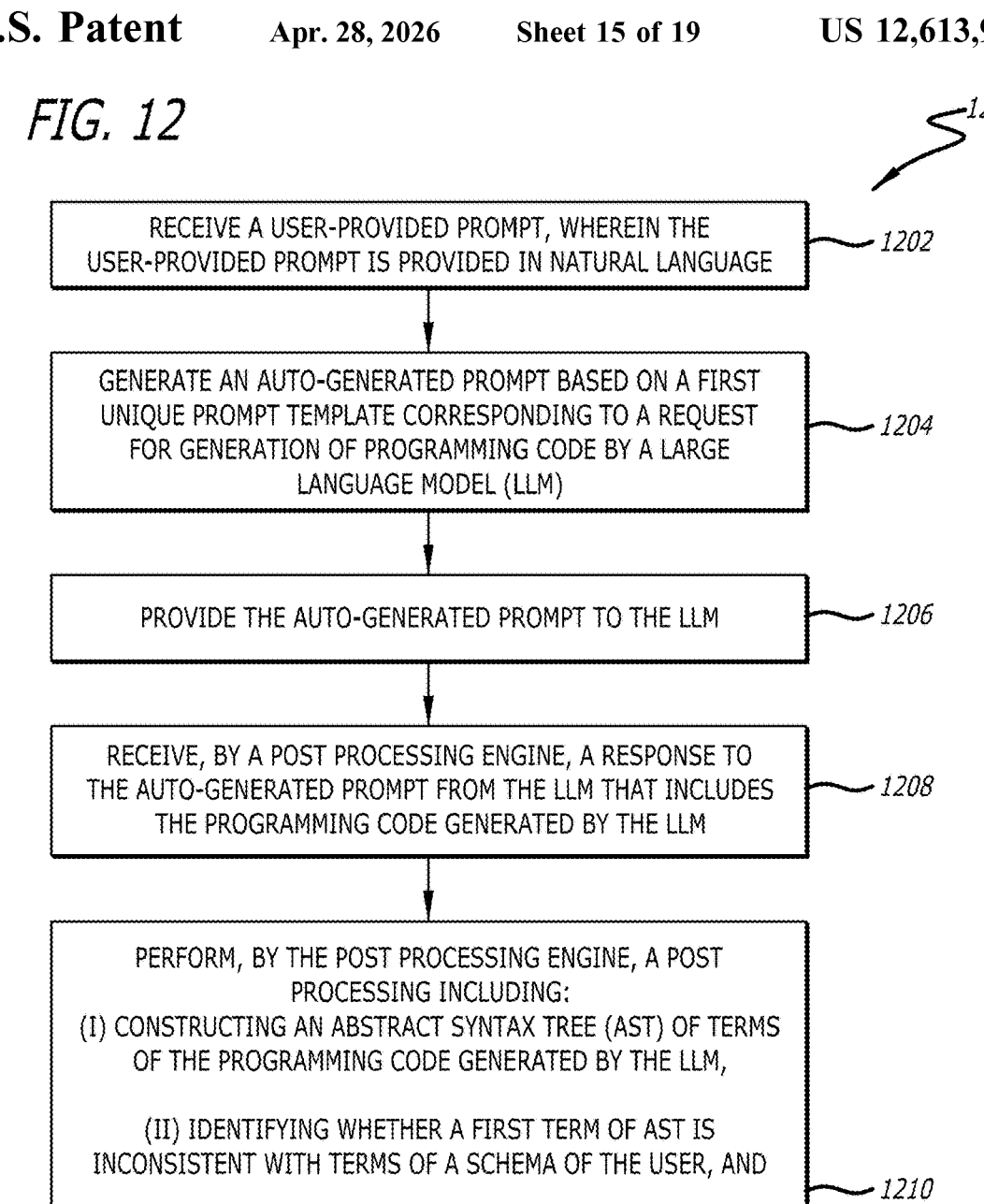

1200

RECEIVE A USER-PROVIDED PROMPT, WHEREIN THE USER-PROVIDED PROMPT IS PROVIDED IN NATURAL LANGUAGE ~ 1202

GENERATE AN AUTO-GENERATED PROMPT BASED ON A FIRST UNIQUE PROMPT TEMPLATE CORRESPONDING TO A REQUEST FOR GENERATION OF PROGRAMMING CODE BY A LARGE LANGUAGE MODEL (LLM) ~ 1204

PROVIDE THE AUTO-GENERATED PROMPT TO THE LLM ~ 1206

RECEIVE, BY A POST PROCESSING ENGINE, A RESPONSE TO THE AUTO-GENERATED PROMPT FROM THE LLM THAT INCLUDES THE PROGRAMMING CODE GENERATED BY THE LLM ~ 1208

PERFORM, BY THE POST PROCESSING ENGINE, A POST PROCESSING INCLUDING:
(I) CONSTRUCTING AN ABSTRACT SYNTAX TREE (AST) OF TERMS OF THE PROGRAMMING CODE GENERATED BY THE LLM, (II) IDENTIFYING WHETHER A FIRST TERM OF AST IS INCONSISTENT WITH TERMS OF A SCHEMA OF THE USER, AND (III) WHEN THE FIRST TERM OF THE AST IS INCONSISTENT WITH THE TERMS OF THE SCHEMA, PERFORMING AN ERROR CORRECTION PROCESS RESULTING IN REPLACEMENT OF A FIRST TERM IN THE PROGRAMMING CODE GENERATED BY THE LLM WITH A FIRST REPLACEMENT TERM OF THE SCHEMA, WHEREIN THE FIRST TERM OF THE PROGRAMMING CODE GENERATED BY THE LLM CORRESPONDS TO THE FIRST TERM OF AST ~ 1210

GENERATE A GRAPHICAL USER INTERFACE (GUI) THAT DISPLAYS THE RESPONSE TO THE AUTO-GENERATED PROMPT WHEN THE TERMS OF THE PROGRAMMING CODE GENERATED BY THE LLM INCLUDING ANY REPLACEMENT TERMS ARE CONSISTENT WITH THE TERMS OF THE SCHEMA ~ 1212

Figure 15:
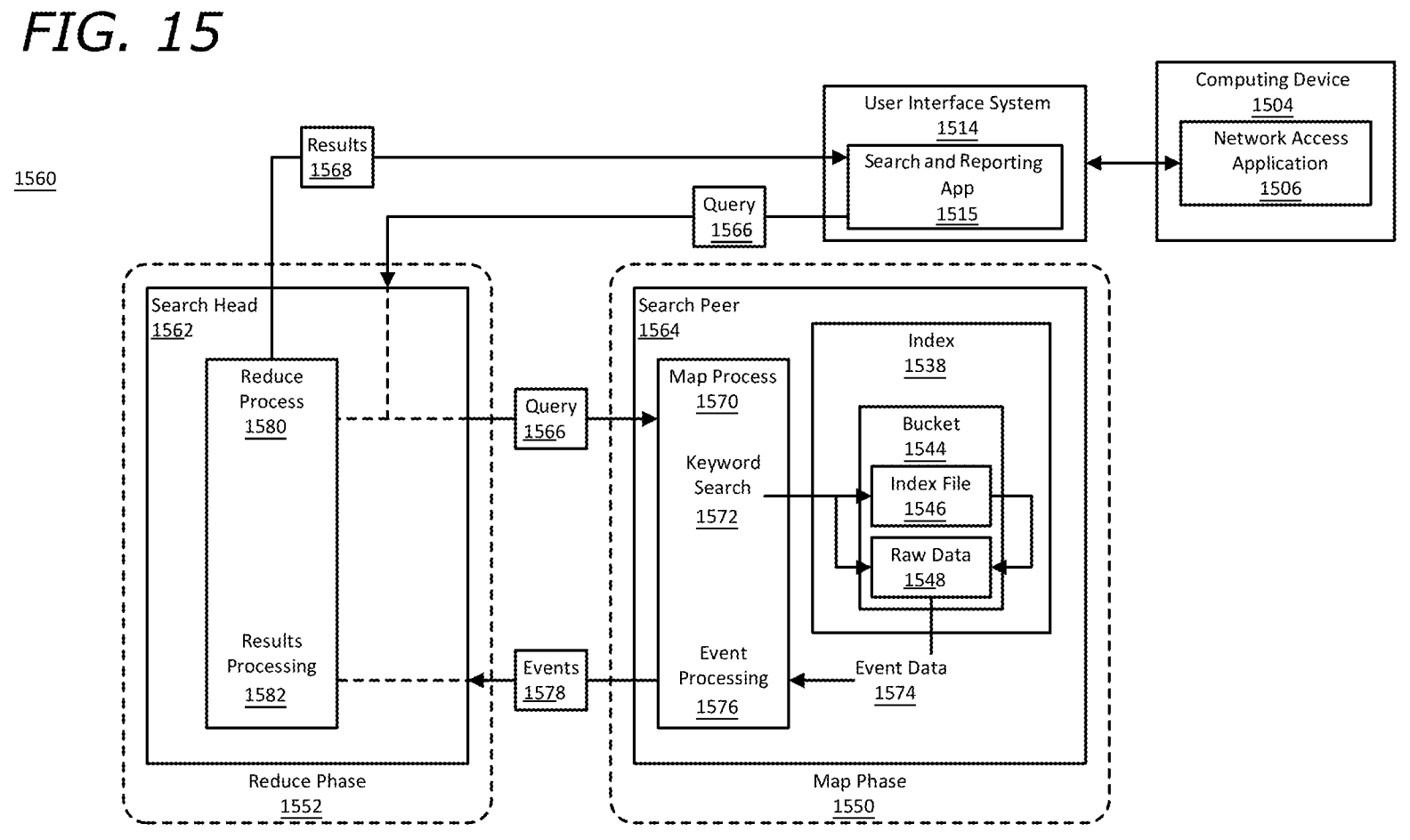

Computing Device 1504 — Network Access Application 1506

User Interface System 1514 — Search and Reporting App 1515

Query 1566

Search Peer 1564

Index 1538

Bucket 1544 — Index File 1546 — Raw Data 1548

Event Data 1574

Map Process 1570 — Keyword Search 1572 — Event Processing 1576

Map Phase 1550

Query 1566

Events 1578

Results 1568

Search Head 1562

Reduce Process 1580 — Results Processing 1582

Reduce Phase 1552

ERROR CORRECTING OF PROGRAMMING CODE GENERATED THROUGH INTEGRATION WITH GENERATIVE ARTIFICIAL INTELLIGENCE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Since the initial public release of ChatGPT by OpenAI in 2022, there has been ubiquitous adoption of the use of large language models (LLMs) in almost every industry including agriculture, fashion design, engineering, marketing, etc. In some examples, LLMs may be deployed to generate software code. In such instances, the LLM may be trained on a diverse dataset of programming languages and coding tasks to ensure it understands syntax, semantics, and common patterns. Individuals in various employment capacities may utilize the LLM to generate code snippets, provide suggestions, and automate repetitive coding tasks.

BRIEF DESCRIPTION OF THE DRAWINGS

Illustrative examples are described in detail below with reference to the following figures:

FIG. 3 is a flowchart illustrating an example process of operations for performing a pipelined search query generation methodology by the pipelined search query generation engine and a large language model (LLM) according to an implementation of the disclosure;

FIG. 6 is a logical diagram of logic components configured to automatically generate synthetic natural language-pipelined search query data pairs according to an implementation of the disclosure;

FIGS. 9A-9B are illustrative graphical user interfaces (GUIs) showing an example deployment of the pipelined search query generation logic module of FIG. 1 according to an implementation of the disclosure;

FIG. 10 is a detailed flowchart illustrating an example process of operations for generating software code in a structured search query language through deployment of a large learning model (LLM) according to an implementation of the disclosure;

FIG. 11 is a detailed flowchart illustrating an example process of operations for performing a retrieval augmented generation (RAG) process corresponding to auto-generation of a prompt for generating software code in a structured search query language through deployment of a large learning model (LLM) according to an implementation of the disclosure;

FIG. 12 is a detailed flowchart illustrating an example process of operations for post-processing a response provided by a large learning model (LLM) that includes auto-generated software code in a structured search query language according to an implementation of the disclosure;

FIG. 15 is a block diagram illustrating in greater detail an example of the search system of a data intake and query system, such as the data intake and query system of FIG. 13 according to an implementation of the disclosure.

DETAILED DESCRIPTION

As mentioned above, since 2022, there has been widespread adoption of the use of large language models (LLMs) across a variety of industries, including technology. The technology industry encompasses a wide range of careers including engineering, software development, product or engineering management, information technology, etc. While many individuals employed within the technology industry may have some familiarity or even expertise in writing software code, that is not always the case. Additionally, given the vast number of programming languages currently in use today and the pace at which new programming languages are continuously introduced, individuals with familiarity or expertise in one programming language may be required to utilize a programming language with which they have little or no familiarity or expertise.

Some of the examples described herein are directed to the deployment of a LLM to automatically generate software code, particularly that in a complex programming language for development of pipelined search query statements known as Search Processing Language (SPL) developed by Splunk Inc. SPL is known as a query language used to search, analyze, and extract insights from machine-generated data. Examples discussed herein include a pipelined search query generation engine that is configured to receive a natural language question pertaining to SPL provided by a user via a network device and execute one of a plurality of pipelines to either generate SPL statements, provide a natural language explanation of an SPL statement, or provide a natural language answer to a question about SPL.

As discussed in further detail below, the pipelined search query generation engine may also be configured to cause execution of SPL statements generated through artificial intelligence (e.g., an LLM). Additionally, the execution of the pipeline for generating SPL statements may include the use of retrieval augmented generation (RAG) in various manners as discussed below and illustrated in the accompanying drawings.

Figure 1:
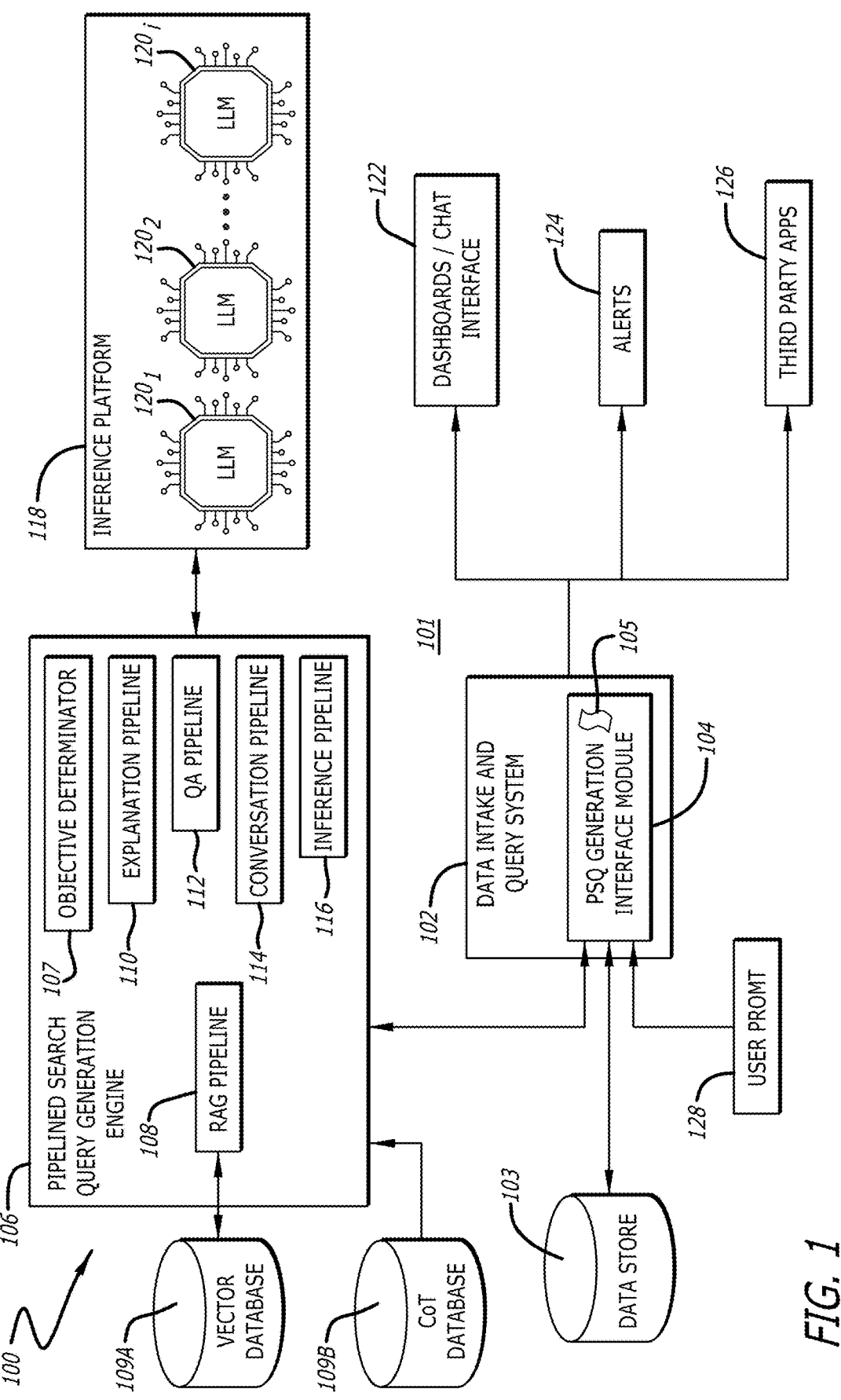
FIG. 1 is a block diagram illustrating a deployment configuration of a networked environment including a pipelined search query generation engine and other network components according to an implementation of the disclosure.

Referring now to FIG. 1, a block diagram illustrating a deployment configuration of a networked environment including a pipelined search query generation engine and other network components is shown according to an implementation of the disclosure. The networked environment 100 is shown to include numerous components, which may comprise logic, upon execution by one or more processors. In some examples, the components may be configured to parse and interpret a natural language prompt received from a user via a network device and execute one or more pipelines in order to generate a response to the natural language prompt.

More generally, some components of FIG. 1 include a data intake and query system 102 that includes a pipelined search query (PSQ) generation interface module 104 that is configured to communicate with a pipelined search query generation engine 106 ("PSQ generation engine" or "generation engine"), which may be a result of the execution of one or more scripts 105 that utilize APIs to exchange data with the generation engine 106. The generation engine 106 includes an objective determinator 107 and a plurality of operational pipelines such as a RAG pipeline 108, an explanation pipeline 110, a QA pipeline 112, a conversation pipeline 114, and an inference pipeline 116. Each operational pipeline may be associated with a particular set of operations specific to an objective of prompts processed by the specific pipeline as discussed below. The generation engine 106 may be communicatively coupled to a vector database 109A, a chain of thought (CoT) database 109B, and an inference platform 118 that is configured to process or execute one or more LLMs $120_1$-$120_i$ (collectively or individually, 120), as well as the data intake and query system 102. The vector database 109A will be discussed in further detail below and the CoT database 109B may store CoT templates that correspond to each a set of predefined objective options as discussed below. The CoT templates may be retrieved by the objective determinator 107 and provided to the applicable pipeline, or a prompt constructor with the individual pipelines may retrieve the applicable CoT template.

The data intake and query system 102 may be configured to provide a user-provided natural language prompt ("user-provided prompt") to the generation engine 106, receive a response from the generation engine 106, and provide the response to the user via a network device, via any of a dashboard or chat interface 122 and/or an alert 124. In some examples, the data intake and query system 102 may execute auto-generated PSQ statements (e.g., PSQ statements generated by an LLM 120, where "PSQ statements" generally may be referred to as "search queries"), where results of the execution may also be provided via the dashboard or chat interface 122 and/or an alert 124. Additionally, the data intake and query system 102 may also be configured to provide instructions to one or more third party applications ("apps") 126 to take specific, automated action based on the response to the user-provided prompt and/or results of execution of the auto-generated search queries.

The objective determinator 107 is configured to determine the objective of the prompt 128 and provide the prompt 128 to the appropriate pipeline. In some examples, the objective determinator 107 is configured to provide the prompt 128 to the inference platform 118 and request an LLM 120 to provide an indication as to whether the objective of the prompt 128 is to request (i) generation of a search query, (ii) explanation of a search query, or (iii) explanation of a pipelined search query language, such as of a particular command. In other examples, the objective determinator 107 determines the objective based on a Uniform Resource Locator (URL) from which the prompt 128 was received. In such examples, a user may provide a prompt through one of three different tabs within a webpage (or alternatively, separate webpages), with each tab being directed to a particular objective and adding a unique keyword to the URL. The objective determinator 107 utilizes the keyword to determine the objective. An example of the three tabs may be seen in FIGS. 10A-10B.

The RAG pipeline 108 may be configured to augment an auto-generated prompt that is configured to request generation of pipelined search query statements by an LLM 120. The explanation pipeline 110 may be configured to deploy an LLM 120 to provide a natural language explanation of pipelined search query statements and the QA pipeline 112 may be configured to deploy a LLM to provide a natural language response to an inquiry about the pipelined search query language. The conversation pipeline 114 and the inference pipeline may be deployed by any of the RAG, explanation, and/or QA pipelines 108, 110, 112 during execution thereof as discussed below.

The data intake and query system 102 may be stored and configured to process locally, such as on on-premise storage and resources, or may be stored and configured process remotely, such as on cloud-computing resources. Execution of search queries by the data intake and query system 102 may include accessing information, such as machine generated data, that is stored in one or more storage modules or resources, collectively illustrated as the data store 103.

As used herein, the term language model may refer to an artificial intelligence (AI) system that is based on a neural network architecture, typically a transformer architecture. In today's technology environment, the terms "language model" and "large language model" are often used interchangeably. However, the naming convention of "large" merely refers to the scale of the language model, which refers to the number of parameters for which the model accounts. The number of parameters typically range from millions to billions, with some even accounting for trillions of parameters. Thus, as used here, the term "language model" encompasses models having varying scales such as those that account for millions, billions, or trillions of parameters. Further, for purposes of simplicity, the term large language model (LLM) will be utilized through the disclosure without implying any restriction or requirement on a number of parameters of the model.

In some implementations, the LLM 120 may be trained on a large corpus of text data to generate human-readable text and often autonomously generate text content in response to a user-provided prompt. The LLM 120 may be fine-tuned on specific training as discussed below and/or receive a specifically engineered, auto-generated prompt that is augmented with data through deployment of a RAG model, and where the specifically engineered, auto-generated prompt is based on a user-provided prompt.

The analysis performed by the LLM 120 resulting in generation of an auto-generated response to the user-provided prompt may include auto-generated search queries, which may be executed by the data intake and query system 102. The results of the execution by the data intake and query system 102 may result in certain actions performed automatically including generation and display of the dashboard or chat interface 122, generation and display or transmission of alerts 124, and/or generation of instructions for or actions performed automatically using a third-party application 126 (e.g., an email client such as, for example, OUTLOOK® provided by Microsoft Corporation, or other email or messaging client where the data intake and query system 102 (e.g., the PSQ generation interface module 104) as depicted generally in FIG. 1 initiates the transmission of information to an end user and/or instructs the browser application, or email or messaging client to take action such as moving emails including a URL determined to be suspicious or malicious from an inbox to a spam folder, deleting an email, flagging an email, etc., and/or blocking a URL at a firewall, web gateway, or other proxy server).

Figure 2A:
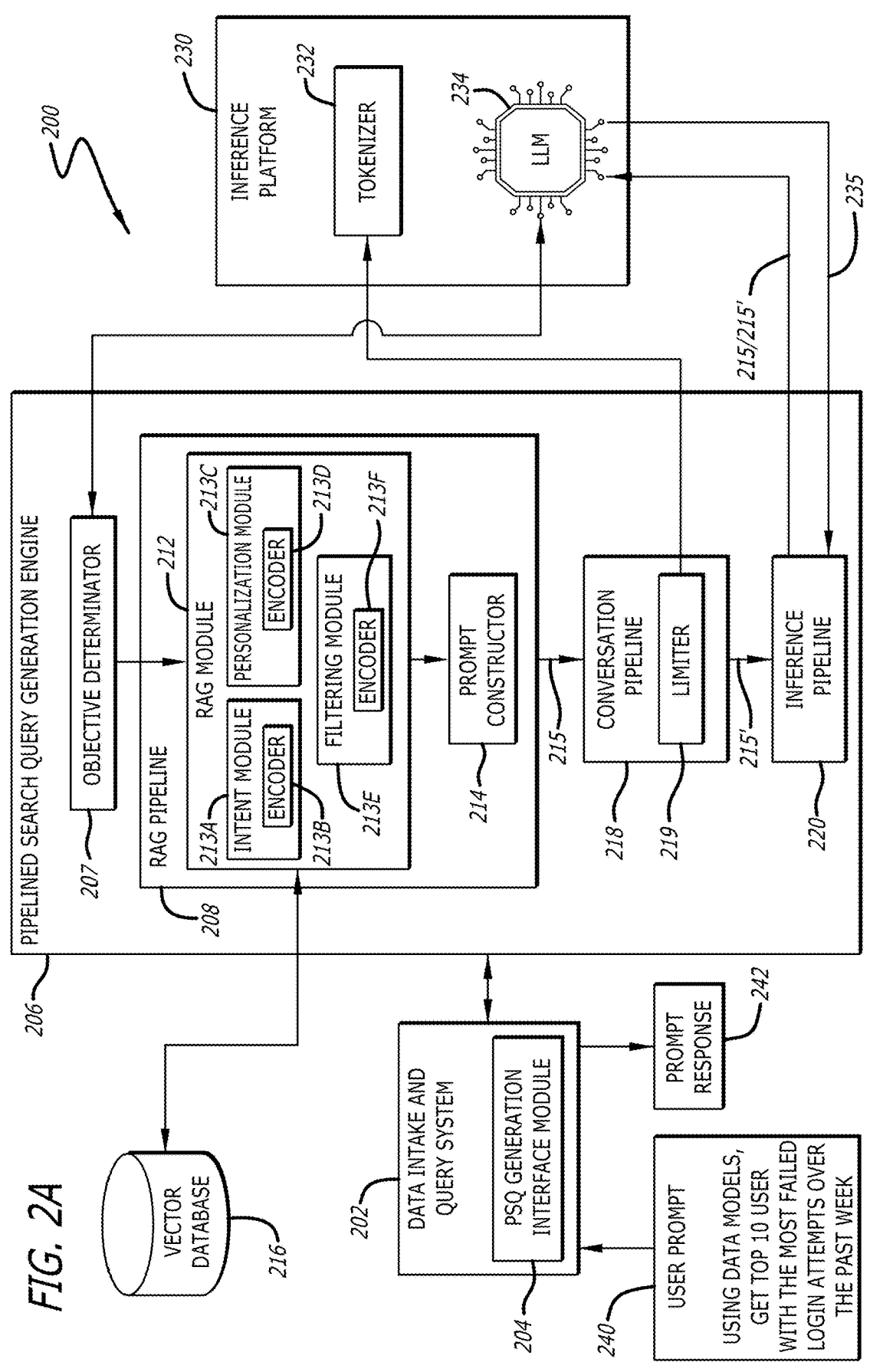
FIG. 2A illustrates a logical diagram representing logic modules of a pipelined search query generation engine according to an implementation of the disclosure.

Referring now to FIG. 2A, a logical diagram representing logic modules of the pipelined search query generation engine of FIG. 1 involved in generation of a pipelined search query is shown according to an implementation of the disclosure. FIG. 2A provides additional detail as to the operability of the RAG pipeline 108, and specifically, functionality provided by the execution of the RAG pipeline 108 upon receipt of a user-provided prompt such that generation of an answer thereto requires auto-generation of search queries. FIG. 2A illustrates a data intake and query system 202 including a PSQ generation interface module 204 ("interface module 204") is in communication with a generation engine 206, which is shown to comprise at least a RAG pipeline 208, a conversation pipeline 218, and an inference pipeline 220. The RAG pipeline 208 may include sub-logic modules such as an objective determinator 207, a RAG module 212, and a prompt constructor 214. The RAG module 212 may be in communication with a vector DB 216 and the generation engine 206 may be in communication with the inference platform 230 that is configured with a tokenizer 232 and one or more LLMs 234. Further, the RAG module 212 may include an intent module 213A that includes an encoder 213B, a personalization module 213C that includes an encoder 213D, and a filtering module 213E that includes an encoder 213F.

As shown in FIG. 2A, an example user-provided prompt 240 may recite, "Using data models, get top 10 users with the most failed login attempts over the past week." Upon receipt of the prompt 240, the interface module 204 provides the prompt 240 to the RAG pipeline 208. The objective determinator 207 performs an initial determination as to whether the prompt 240 requires augmentation through a RAG process, where augmentation may include appending historical search queries that have at least a level of similarity to the prompt 240. The objective determinator 207 determines whether augmentation is needed by analyzing the prompt 240 to determine whether the request set forth is referring to a previous exchange within the chat history, e.g., whether the request is to correct or modify a prior response provided by the LLM 234. In the event augmentation is not needed, the objective determinator 207 may provide the prompt 240 directly to the prompt constructor 214 bypassing the RAG module 212.

When augmentation is determined to be needed, the RAG pipeline 208 may utilize the intent module 213A and/or the personalization module 213C to obtain RAG data from the vector database 216. Optionally, the filtering module 213E may then be utilized to filter the retrieved RAG data to provide RAG data depending on a desired level of variance (e.g., RAG data that is either highly similar or includes diverse results). The intent module 213A is configured to identify and retrieve {natural language, search query syntax} pairing examples from the vector database 216. In particular, the encoder 213B is configured to encode the user-provided prompt 240 resulting in an embedding, e.g., a fixed-size vector, and compute a similarity measure between the vectorized user-provided prompt and embeddings of natural language statements stored in the vector database 216. The {natural language, search query syntax} pairing examples that have a similarity measure satisfying a similarity comparison (e.g., meets or exceeds the similarity threshold) are retrieved and may be provided: (i) directly to the prompt constructor 214 to be appended to an auto-generated prompt discussed below, (ii) to the personalization module 213C as discussed below, or (iii) may be provided to the filtering module 213E. In some examples, the similarity measure may include a cosine similarity, a Euclidean distance, a Manhattan distance, a Jaccard similarity, etc., between two vectors, The {natural language, search query syntax} pairing examples may be curated from publicly available data or from tenant specific data (e.g., verified natural language translations that are particular to the user, the user's role within an enterprise, the user's geolocation, etc.). In some examples, the RAG data that are considered for relevancy for a particular user may be dependent on the user specifically, an employer of the user, a department or working group of an employer to which the user belongs, etc. For example, historical search queries provided to a data intake and query system 202 may be tagged with a username of the user that provided or executed the query and accessible to only that user for augmentation. Thus, a username may be provided with the user-provided prompt 240, where the username (or other identifying data that is used to identify and validate a user) is used to perform rule-based access-control (RBAC) such that the retrieval of past pipelined search query statements from the vector DB 216 is limited based on the user's identity. Similar RBAC enforcement may be applied to retrieval of {natural language, search query syntax} pairing examples. Additional details as to the accessibility of certain data within the vector database 216 for a particular user is discussed in further detail below at least with respect to FIG. 5.

The personalization module 213C is configured to retrieve search queries that have been previously executed by the user that provided the prompt 240 or from tenant specific data as explained above. The encoder 213D is configured to encode the search query syntax of the {natural language, search query syntax} pairing examples retrieved by the personalization module 213A, resulting in embeddings of the search query syntax. Thus, the encoders 213B and 213D differ in that they are trained on different historical data (natural language and search query syntax, respectively) and are similarly configured to generate different embeddings. Similarity measures are then computed between the search query syntax embeddings and at least a portion of the search query syntax embeddings stored in the vector database 216.

The search query syntax examples stored in the vector database 216 that have a similarity measure satisfying a similarity comparison (e.g., meets or exceeds the similarity threshold) are retrieved and may be provided: (i) directly to the prompt constructor 214 to be appended to an auto-generated prompt discussed below or (ii) may be provided to the filtering module 213E.

The filtering module 213E includes an encoder 213F that is configured to select a subset of the RAG data retrieved by the intent module 213A and the personalization module 213C. For example, a predetermined variance level may be established such that the filtering module 213E performs a similarity measure between (i) the natural language descriptions of the retrieved {natural language, search query syntax} pairing examples and select a subset {natural language, search query syntax} pairing examples that are most similar (e.g., top 50% most similar) or another percentage such as the top 25% most similar and the top 25% least similar to provide for a high level of variance, and (ii) the retrieved search query syntax and select a subset in the same manner as with the natural language descriptions. The encoder 213F may represent multiple encoders, e.g., a first encoder for encoding natural language and a second encoder for encoding search query syntax.

Following retrieval of RAG data from the vector DB 216 and optionally filtered by the filtering module 213E, the prompt constructor 214 automatically constructs a prompt 215 to be provided to the conversation pipeline 218. In some examples, the prompt constructor 214 may construct the prompt 215 by retrieving a CoT template corresponding to the objective of the prompt 240. As noted above, the objective of the prompt may be determined by the LLM 234 or according to a URL from which the prompt 240 was received. When the CoT template does not require augmentation (e.g., the objective of the prompt 240 is to explain PSQ or answer an inquiry about the PSQ language itself as discussed below), the text of the prompt 240 is added to the CoT template, which is provided to the conversation pipeline 218, which appends chat history to the CoT template, which is then provided to the inference platform 230 (e.g., LLM 234) for execution and processing. Alternatively, when the objective of the prompt 240 requires augmentation, the RAG data obtained from the RAG module 212 and the text of the prompt 240 are added to the CoT template along with the RAG. The CoT template is then provided to the conversation people 218 as noted above for appending of chat history and to the inference platform 230 by way of the inference pipeline 220.

The conversation pipeline 218 is configured to determine the length of a chat history between the user and the generation engine 206, truncate the chat history if necessary, and append the chat history to the prompt 215. In some examples, the chat history may be provided to the generation engine 206 by the interface module 204. The conversation pipeline 218 may use a limiter logic module 219 that truncates the chat history to a particular size (e.g., in bytes) or length (e.g., measured in characters or tokens, which may be white-spaced delimited words). In some examples, the chat history may be provided to the tokenizer 232 processing on the inference platform 230, which is configured to tokenize the chat history.

The prompt 215 (optionally prompt 215' if chat history is appended) is provided to the inference pipeline 220, which transmits the prompt 215/215' to the inference platform 230 via an API for processing by the LLM 234. The inference pipeline 220 receives the results 235 from LLM 234, which are provided to the interface module 204. The results 235 may then be formatted in a particular manner for display to the user, e.g., as prompt response 242. In some instances, as discussed above, the results 235 may include auto-generated search queries that are executed automatically by the data intake and query system 202, where results of the execution are included in the prompt response 242.

Figure 2B:
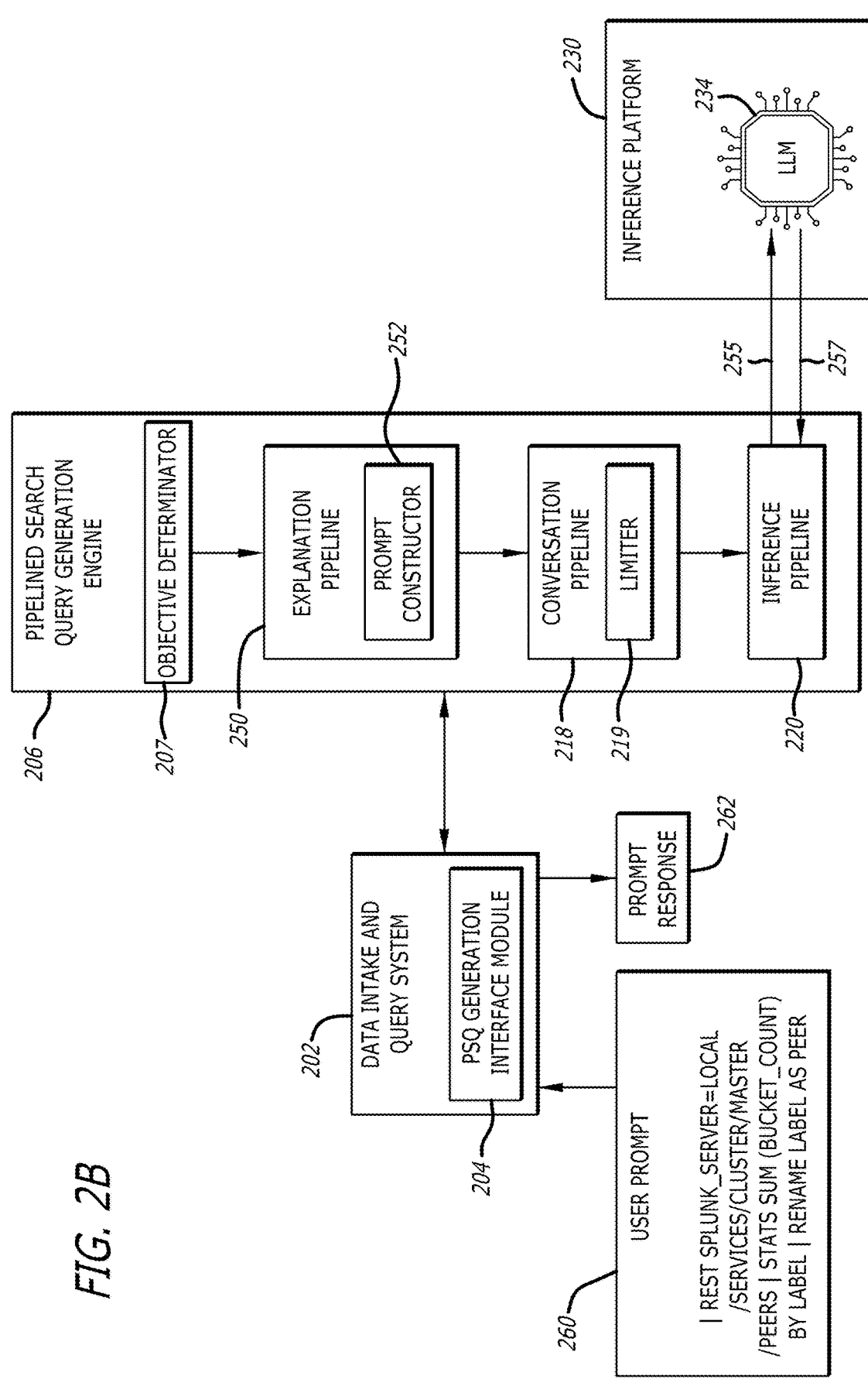
FIG. 2B is a logical diagram representing logical detail of a portion of the pipelined search query generation engine FIG. 1 involved in providing a natural language explanation of a pipelined search query according to an implementation of the disclosure.

Referring now to FIG. 2B, a logical diagram representing logical detail of a portion of the pipelined search query generation engine FIG. 1 involved in providing a natural language explanation of a pipelined search query is shown according to an implementation of the disclosure. FIG. 2B provides additional detail as to the operability of the explanation pipeline 110, and specifically, functionality provided by the execution of the explanation pipeline 110 upon receipt of a user-provided prompt such that generation of an answer thereto requires an auto-generate natural language explanation of search queries comprising the user prompt 260. FIG. 2B illustrates many of the same components as discussed above with respect to FIG. 2A, which will not be discussed unless additional or alternative function of one or more of the components is discussed.

As shown in FIG. 2B, an example user-provided prompt 260 may recite the PSQ statement:

| rest splunk_server=local/services/cluster/master/peers| stats sum (bucket_count) by label| rename label as peer Upon receipt of the prompt 260, the interface module 204 provides the prompt 260 to the explanation pipeline 250 and the prompt constructor 252 obtains a CoT template directed to instructing the LLM 234 on the expected response by defining the the question to be addressed, outlining initial information and assumptions, in some cases, providing a set of steps for the LLM 234 to perform that will result in the desired response. The prompt constructor adds the text of the prompt 260 to the CoT template forming an auto-generated prompt 255, which is then provided to the inference pipeline 220. The inference pipeline 220 transmits the prompt 255 to the inference platform 230 for processing by the LLM 234, receives results 257 from the LLM 234, and forwards the results 257 to the interface module 204, which may be displayed to the user in any of the manners described above as prompt response 262.

Figure 2C:
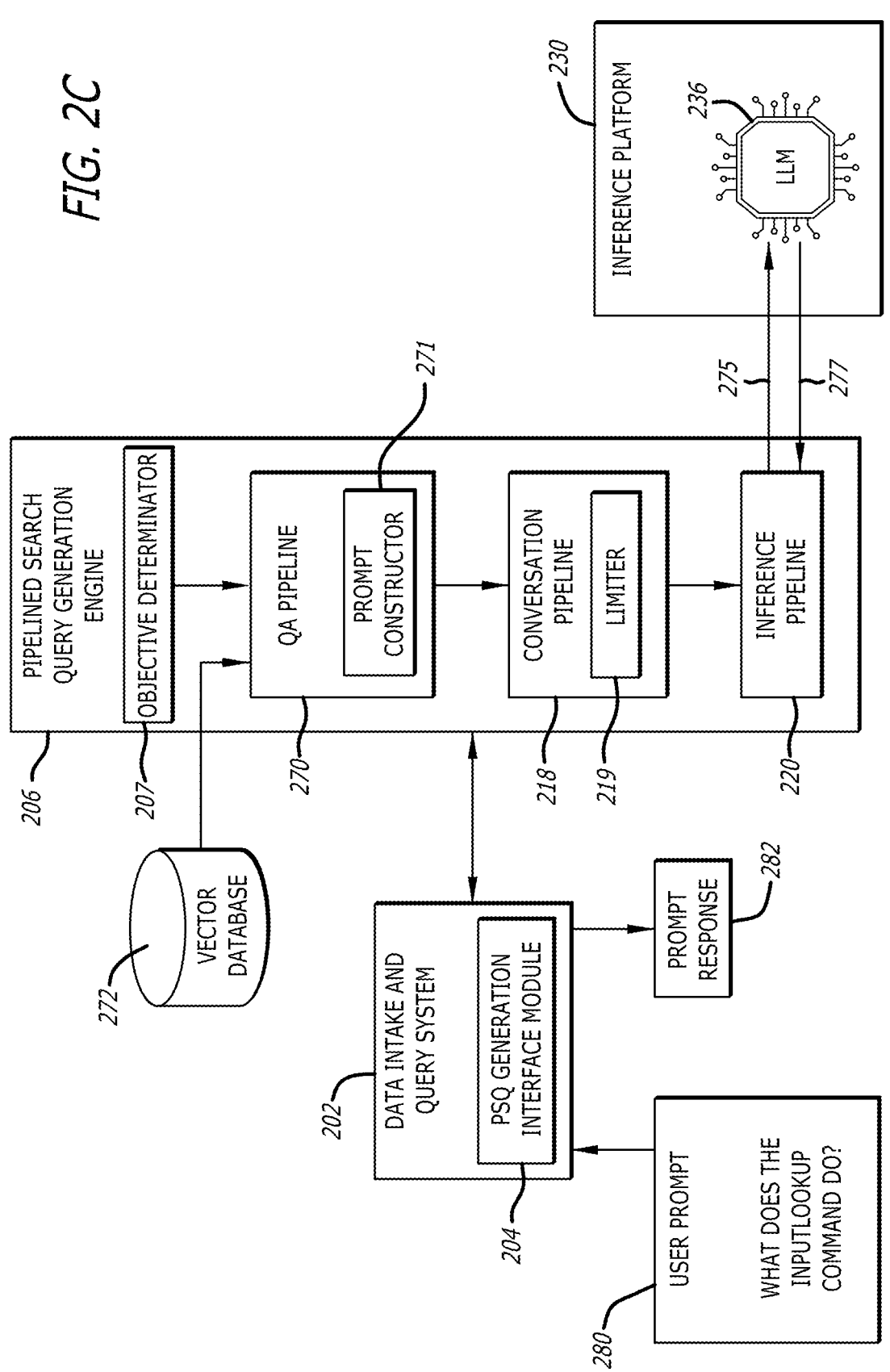
FIG. 2C is a logical diagram representing logical detail of a portion of the pipelined search query generation engine FIG. 1 involved in providing a natural language response to a natural language question pertaining to a pipelined search query or the pipelined search query language generally according to an implementation of the disclosure.

Referring now to FIG. 2C, a logical diagram representing logical detail of a portion of the pipelined search query generation engine FIG. 1 involved in providing a natural language response to a natural language question pertaining to a pipelined search query or the pipelined search query language generally is shown according to an implementation of the disclosure. FIG. 2C provides additional detail as to the operability of the QA pipeline 112, and specifically, functionality provided by the execution of the QA pipeline 112 upon receipt of a user-provided prompt such that generation of an answer thereto may include utilization of explanatory or information documentation including specific technical information by a LLM 236. It is noted that the LLM 234 as illustrated in FIGS. 2A-2B differs from the LLM 236 as illustrated in FIG. 2C. Such distinction is merely intended to show that different LLMs may be processing on the inference platform 230 and be employed by the generation engine 206. However, in some examples, the same LLM may be employed for processing by each pipeline described int the FIGS. 2A-2C, while in other examples, different LLMs may be utilized for each different pipeline. As with FIG. 2B, FIG. 2C illustrates many of the same components as discussed above with respect to FIG. 2A, which will not be discussed unless additional or alternative function of one or more of the components is discussed.

As shown in FIG. 2C, an example user-provided prompt 280 may recite, "What does the inputlookup command do?" Upon receipt of the prompt 280, the interface module 204 provides the prompt 280 to the objective determinator 207, which determines the objective of the prompt 280 as discussed above. When the objective is to request an answer explaining an aspect of a pipelined search query language, the QA pipeline 270 receives the prompt 280. The prompt constructor 271 obtains a CoT template directed to instructing the LLM 234 on the expected response by defining the the question to be addressed, outlining initial information and assumptions, in some cases, providing a set of steps for the LLM 234 to perform that will result in the desired response. The prompt constructor adds the text of the prompt 280 to the CoT template forming an auto-generated prompt 275, which is then provided to the inference pipeline 220. The inference pipeline 220 transmits the prompt 275 to the inference platform 230 for processing by the LLM 234, receives results 277 from the LLM 234, and forwards the results 277 to the interface module 204, which may be displayed to the user in any of the manners described above as prompt response 282.

Referring to FIG. 3, a flowchart illustrating an example process of operations for performing a pipelined search query generation methodology including augmentation thereof by the pipelined search query generation engine and a large language model (LLM) is shown according to an implementation of the disclosure. The example process 300 may be implemented, for example, by a computing device that comprises one or more processors and non-transitory computer-readable medium. The non-transitory computer readable medium may store instructions that, when executed by the processor(s), cause the processor(s) to perform the operations of the illustrated process 300.

Each block illustrated in FIG. 3 represents an operation of the process 300. It should be understood that not every operation illustrated in FIG. 3 is required. In fact, certain operations may be optional to complete aspects of the method 300. The method 300 begins with an operation of receiving a natural language prompt from a user (user-provided prompt) requesting or involving the translation of natural language to a pipelined search query (block 302).

Following receipt of the user-provided prompt, a determination is made as to whether the user-provided prompt requires augmentation through a RAG process. In many cases, the user-provided prompt will benefit from augmentation, such as appending of historical search queries to assist a large learning model in auto-generating a pipelined search query required to answer the question or request set forth in the user-provided prompt (block 304). The user-provided prompt is then encoded by processing the user-provided prompt by a bi-encoder, which results in a fixed-size vector A first RAG process (an intent RAG process) is performed that includes encoding the user-provided prompt with a first encoder resulting in a prompt embedding (block 306). The first RAG process further includes retrieving {natural language, search query syntax} pairings from a vector database that have at least a threshold level of similarity with the prompt embedding. The first RAG process may be performed by the intent module 213A of FIG. 2A. Following the first RAG process, a second RAG process (a personalization RAG process) may be performed by encoding the search query syntax retrieved during the first RAG process resulting in search query syntax embeddings (block 308). The second RAG process further includes retrieving historical search queries from the vector database that have at least a threshold level of similarity with one or more of the search query syntax embeddings. The second RAG process may be performed by the personalization module 213C of FIG. 2A. Optionally, a filtering process may be performed to select a subset of the RAG data retrieved during the first and second RAG processes (block 310). The filtering process may be performed by the filtering module 213E of FIG. 2A.

Following the encoding of the user-provided prompt, historical search queries relevant to the user-provided prompt are identified based on a similarity threshold comparison between the encoded user-provided prompt and historical search queries (block 308). For example, historical search queries may be stored as vectors in a vector database, e.g., the vector DB 216 of FIG. 2A, and a similarity measure may be computed between the encoded user-provided prompt and at least a subset of the historical search queries stored as vectors. When the similarity measure for a particular historical search query satisfies a threshold comparison, e.g., meets or exceeds, the particular historical search query is identified as being relevant to the user-provided prompt. As discussed above, at least with respect to FIG. 2A, only a portion of the historical search queries may be candidates for augmentation based on the characteristics of the user that provided the prompt, where the characteristics may include user role, user department, geolocation, etc.

An auto-generated prompt is then constructed based on the user-provided prompt with the relevant historical search queries included therein to provide additional context (block 310). Following the construction of the auto-generated prompt, an optional operation may include appending at least a portion of a chat history of the user to the auto-generated prompt (block 312). For example, a user may provide a prompt to be processed by a large learning model (LLM) through a graphical user interface (GUI) that resembles a chat. Examples of such as provided in FIGS. 10A-10B. The term "chat history" may refer to a sequence of prior interactions between the user and the LLM, e.g., prompts and responses thereto.

The auto-generated prompt is then transmitted to a LLM for processing, and a response is received that includes an auto-generated pipelined search query (blocks 314, 316). In some instances, the response may be provided to the user, such as through a GUI display (block 320). However, in some instances, the auto-generated pipelined search query is executed by a data intake and query system such that results to the pipelined search query are included in the response to the user (blocks 318, 320). In some examples, the inference pipeline analyzes the response from the LLM and determines whether the response includes an auto-generated search query. When an auto-generated search query is detected (e.g., parsing the response 235 for syntax of one of a plurality of search query languages such as SPL, SQL, KQL, etc.), the inference pipeline may indicate such to and instruct the data intake and query system to automatically execute auto-generated search query such that the results of the auto-generated search query may be included directly within the prompt response provided to the user.

Figure 4:
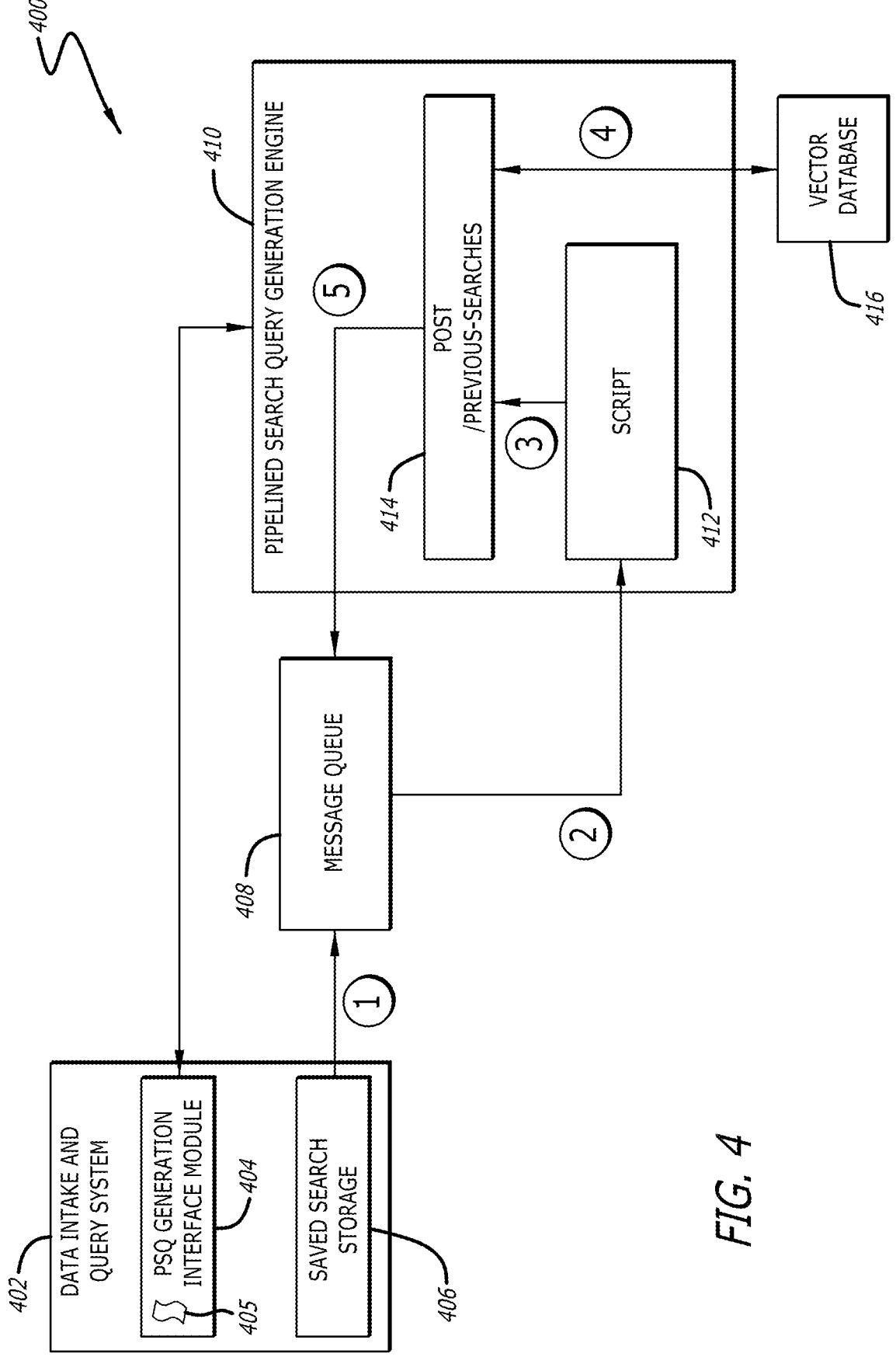
FIG. 4 is a block diagram illustrating a flow of operations for saving user-provided prompts into a vector database according to an implementation of the disclosure.

Referring to FIG. 4, a block diagram illustrating a flow of operations for saving user-provided prompts into a vector database is shown according to an implementation of the disclosure. FIG. 4 illustrates an endpoint, e.g., a data intake and query system 402, that is configured to receive or retrieve user-provided prompts (and optionally the corresponding responses) and deposit the prompts into a public cloud storage container, e.g., a message queue 408. An example of a message queue may be a storage container in AMAZON SIMPLE STORAGE SERVICE ("Amazon S3")

provided by Amazon Web Services, Inc. The user-provided prompts may be initially stored in the saved search storage 406 of the data intake and query system 402, which is also shown to include a PSQ generation interface module 404 that may include one or more scripts 405. The deposit of the prompts into the message queue 408 is illustrated in FIG. 4 as the operation labeled (1). In some examples, a script or search query is run periodically that retrieves search queries run by a user and saves such in the saved search storage 406.

FIG. 4 illustrates that a script 412, processing within the generation engine 410 may poll the message queue 408 periodically, or upon a triggering event to retrieve new prompts deposited therein. The polling is illustrated in FIG. 4 as the operation labeled (2). The operation "POST/previous-searches" 414 receives the prompts deposited in the message queue 408, which is illustrated as the operation labeled (3). The operation 414 further includes ingesting, logging, and indexing the prompts into a database, e.g., the vector DB 416. The indexing and storage may also include attaching metadata to the prompts such as a name of a user that provided the prompt (or other identifying and validating information as noted above) and the role(s) of the user such as admin, user, etc. The storage of the indexed prompts is illustrated by the operation labeled (4). Following indexing and storage of the prompts, the generation engine 410 may then delete the prompts from the message queue 408, which is illustrated by the operation labeled (5).

Figure 5:
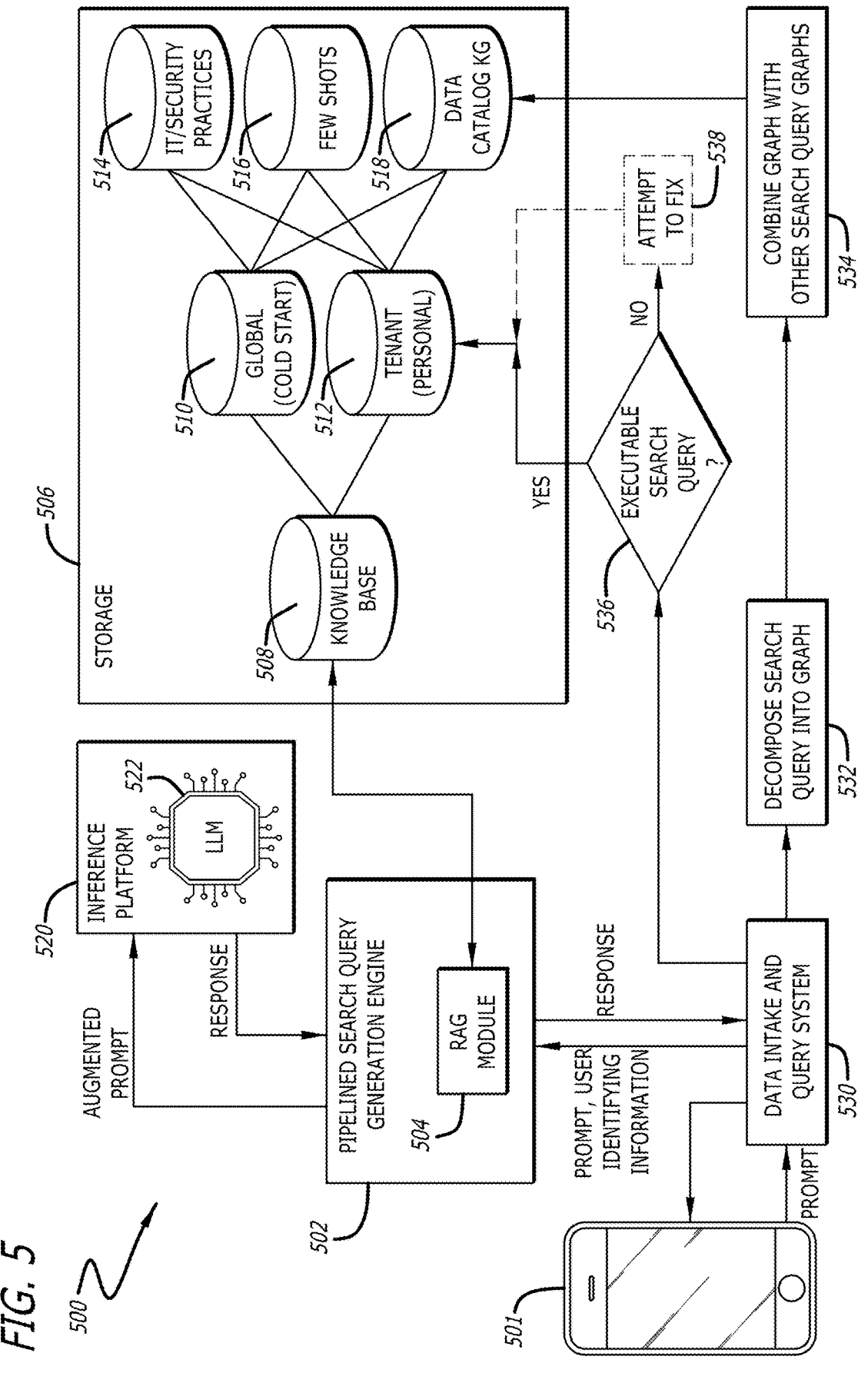
FIG. 5 is a diagram illustrating the flow of data beginning with a natural-language user prompt and resulting in an answer generated by the pipelined search query generation engine of FIG. 1 and a large language model (LLM) according to an implementation of the disclosure.

Referring now to FIG. 5, a diagram illustrating the flow of data including augmenting a natural-language user prompt, processing the augmented prompt by a large language model (LLM), providing the response to the user, and optionally storing the response for future augmentation is shown according to an implementation of the disclosure. The networked environment 500 of FIG. 5 includes a network device 501, a generation engine 502 that includes a RAG module 504, and a storage 506 that includes a knowledge base 508 that may be subdivided into a global (cold start) database 510 and a tenant (personal) database 512, each of which may access data stores including an IT/security practices data store 514, a few shots data store 516, and a data catalog knowledge graph (KG) 518. Of course, in various implementations, the data bases may be combined in any manner. The networked environment 500 also includes a data intake and query system 530.

As shown, the network device 501 may provide a natural-language prompt to the data intake and query system 530 as has been discussed above. The prompt and user identifying information (e.g., a username) may then be provided to the generation engine 502. The RAG module 504 may then seek to augment the prompt using best practice context (which may be stored in the IT/security practices data store 514), examples of historical search queries (which may be stored in the few shots database 516), and/or schema information associated with the user or user role (which may be stored in the data catalog KG 518). The knowledge graph 508 is access by the RAG module 504 and a subdivision thereof is accessed depending on whether the user of the network device 501 is (i) a new user for which personalized information has not yet been collected in which case the global (cold start) database 510 is accessed, or (ii) a user for which personalized information has been collected in which case the tenant (personal) database 512 is accessed.

The global (cold start) database 510 may include publicly available information such as best practices pertaining to a command or type of prompt to be augmented as context and/or few shot examples of publicly available search queries including one or more of the same commands as included in the user-provided prompt. However, when personalized information has been collected, the user identifying information may be utilized to access the tenant (personal) database 512 and retrieve data to augment the prompt that is specific the user, the user's role within an enterprise (e.g., IT administrator, engineering, etc.) as users in similar roles may often utilize similar search queries, historical search queries that were previously executed by the user and/or others in the user's role, and/or schema information associated with the user and/or user role (such as the structure of tables or indexes that are accessible by the user).

The returned information may be appended to the prompt by the RAG module 504 (or another logic component such as a prompt constructor as discussed above), where the augmented prompt may be provided to an LLM 522 processing on an inference platform 520. The LLM 522 processes the augmented prompt and returns a response that may include an auto-generated search query that either forms a portion of the response itself that will be provided to the user or is to be executed such that the results of the execution of the auto-generated search query form a portion of the response provided to the user.

The response that includes an auto-generated search query is then provided to the data intake and query system 530. In some instances, the response is returned to the user via the network device 501, e.g., via a GUI. In other instances, the data intake and query system 530 executes the auto-generated search query and includes results thereto in the response provided to the user. In yet other instances, the auto-generated search query (and optionally response), may be decomposed into one or more graphs (e.g., an indication or listing that the components of fields forming the auto-generated search query belong to or form certain tables or indexes), which is labeled with reference number 532. For example, a first command may indicate that a Table_1 includes fields F1 and F2, while a second command may indicate that Table_1 includes field F3, where two graphs are formed, one each for the first and second commands. The graphs may then be combined based on the inclusion of Table_1 in both resulting in a graph indicating that Table_1 includes fields F1, F2, F3. The graph(s) may be stored in the data catalog KG 518.

Additionally, when the auto-generated search query is executable, the auto-generated search query may be stored in the tenant (personal) database 512 (or within the few shots database 516 sub-division). When the auto-generated search query is not executable, an attempt may be made to correct or fix the auto-generated search query as discussed below with respect to FIG. 7.

Referring to FIG. 6, a flowchart illustrating an example process of operations for automatically generating synthetic {natural language, search query} pairs using a large language model (LLM) is shown according to an implementation of the disclosure. The example process 600 may be implemented, for example, by a computing device that comprises one or more processors and non-transitory computer-readable medium. The non-transitory computer readable medium may store instructions that, when executed by the processor(s), cause the processor(s) to perform the operations of the illustrated process 600.

Each block illustrated in FIG. 6 represents an operation of the process 600. It should be understood that not every operation illustrated in FIG. 6 is required. In fact, certain operations may be optional to complete aspects of the method 600. The method 600 begins with an operation of receiving a {natural language, search query} pairing to be utilized in making synthetic {natural language, search query} pairs, e.g., for storage in a few shots database (block 602). The process 600 continues with providing a first prompt including the originally-received search query to an LLM requesting that the LLM generate an auto-generated natural language description of the search query, where the search query is provided in a structured query language such as SPL, or alternatives such as Structured Query Language (SQL) or Kusto Query Language (KQL) (block 604).

Additionally, a second prompt including the auto-generated natural language description of the search query is provided to the LLM requesting that the LLM generate an auto-generated search query from the auto-generated natural language description, where the auto-generated search query is provided in the structured query language (block 606). Thus, a round-trip method of translation is performed to generate the second version of the search query by the LLM. In addition to the round-trip method, a third prompt including the auto-generated search query may be provided to the LLM requesting that the LLM generate a second version of an auto-generated natural language description of the auto-generated search query, where the auto-generated search query is provided in the structured query language (block 608). The third prompt may correspond to a double round-trip method. Finally, each of the versions of the natural language description and search query may be stored as few shot examples (block 610).

Figure 7:
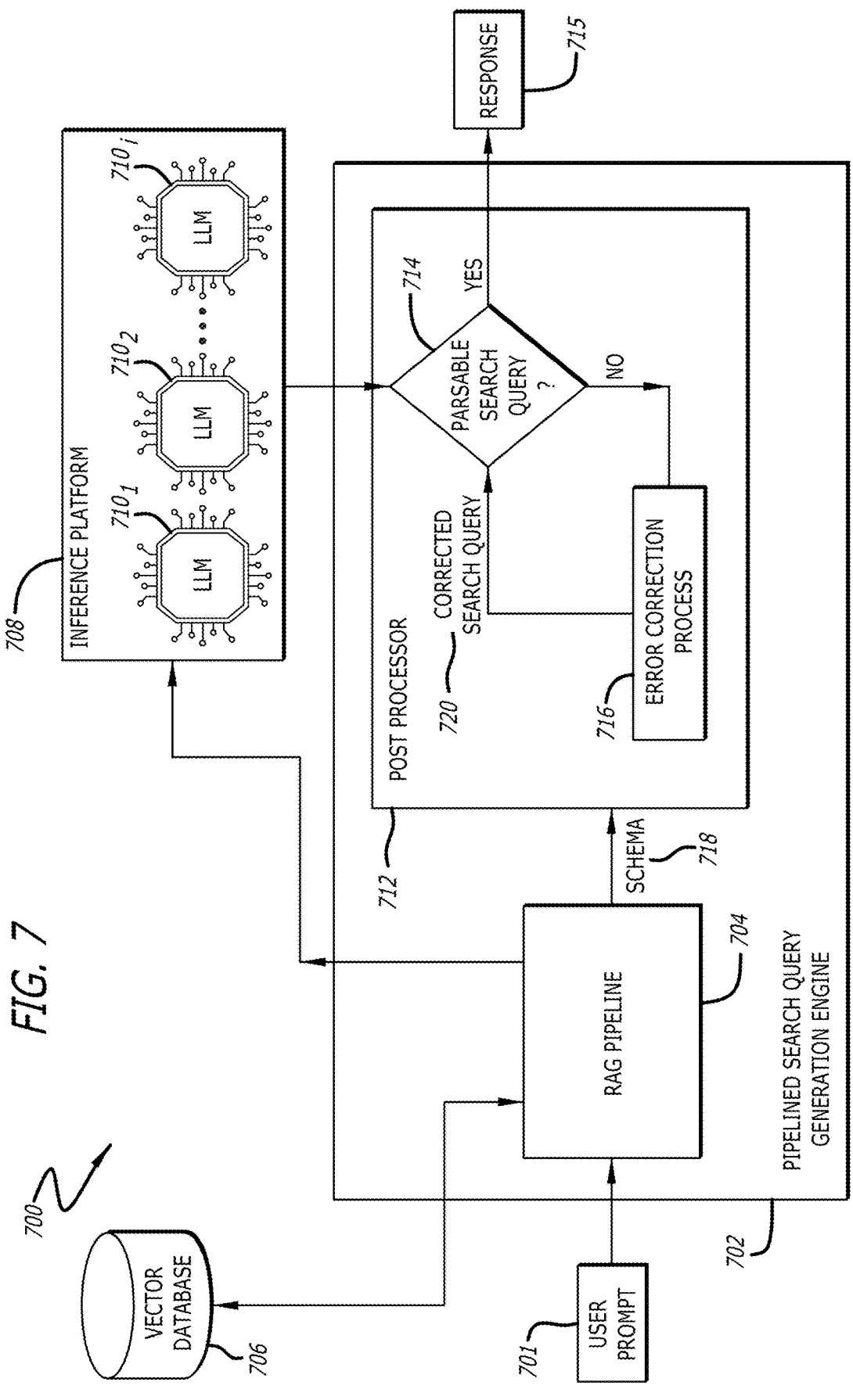
FIG. 7 is a diagram illustrating deployment of a schema verification methodology to reduce hallucinations during generation of an answer to a natural-language user prompt by a large language model (LLM) according to an implementation of the disclosure.

Referring to FIG. 7, a diagram illustrating deployment of a schema verification methodology to reduce hallucinations during generation of an answer to a natural-language user prompt by a large language model (LLM) is shown according to an implementation of the disclosure. FIG. 7 illustrates a networked environment 700 that includes many components discussed previously including a generation engine 702 including a RAG pipeline 704, a vector DB 706, and an inference platform 708 including one or more LLMs $710_1$-$710_i$ (collectively or individually, 710).

FIG. 7 illustrates that the generation pipeline 702 may also include a post-processor 712 that provides post-processing on responses from an LLM 710. In some examples, the post-processing includes determining whether auto-generated pipelined search query statements included in the response are parsable using the schema 718. In some examples, parsing includes decomposing the search query statements into an abstract syntax tree (AST). Decomposing a search query statement into an ATS may involve tokenizing the fundamental units comprising the search query statement (such as keywords/terms, operators, parentheses) and creating a hierarchical structure of the search query by identifying a keyword as a root node, traversing the list of fundamental units and applying grammatical/syntax rules to build the AST. Additionally, the post processor 712 determines whether the ATS is consistent with the schema 718, which provides an organizational structure of data fields within events that are accessible and searchable by the permissions of the user. The schema 718 may provide at least a listing of fields (e.g., column headers) and field types such as string, number, Boolean, IP address, etc. When the response provided by the LLM 710 is able to be decomposed into an AST (e.g., no syntax or structural errors are detected in building the AST) and the keywords/terms of the AST are consistent with the schema 718, the search query of the response is determined to be parsable. When either building an AST fails or the keywords/terms are inconsistent with the schema 718, the search query of the response is identified as being not parsable.

When the auto-generated search query statements are parsable (yes at 714), the response 715 may be provided to the user, e.g., via an interface module of a data intake and query system as shown in FIG. 1. When the auto-generated search query statements are not parsable (no at 714), the post-processor is configured to perform an error correcting process 716 that may include identifying and replacing hallucinated values with schema values set forth in the schema 718 provided by the RAG pipeline 704. For example, when a value within the auto-generated search query is not within the schema associated with the user, the post-processor 702 may determine a replacement value from the schema by computing a similarity measure between the hallucinated value and values of the schema 718. When the similarity measure satisfies a threshold, e.g., the replacement value is within a threshold distance from the hallucinated value, the post-processor replaces the hallucinated value with the replacement schema value resulting in a corrected auto-generated search query 710. The corrected auto-generated search query 710 is then analyzed again for parsability such that the corrected auto-generated search query 710 may be provided as response 715 or may undergo an additional error correction process 716.

As one example, the user prompt may include a request such as "Give me the Windows events for the last 10 days." The LLM 710 may include a command in the auto-generated search query that filters by "Windows events" (e.g., retrieves data within a table having a column name of "Windows events"). However, in the situation in which "Windows events" is not a valid value within the schema associated with the user, the inclusion of "Windows events" in the response is a hallucination. Thus, the parsing process 714 identifies that the value "Windows events" is not a valid keyword in the schema associated with the user and instead computes a similarity measure between the term "Windows events" and others noted in the schema 718. The similarity measure may be the edit distance between two terms, also known as the Levenshtein distance, which is a measure of similarity between two strings and represents the minimum number of single-character edits (insertions, deletions, or substitutions) required to transform one string into the other. The lower the edit distance, the more similar the two terms are. Continuing the example, the error-correcting process 716 may seek to replace the term "Windows event" with a term in the schema 718 having an edit distance that satisfies a threshold comparison, e.g., less than or equal to the threshold distance. One example replacement term may be "Win65".

Figure 8:
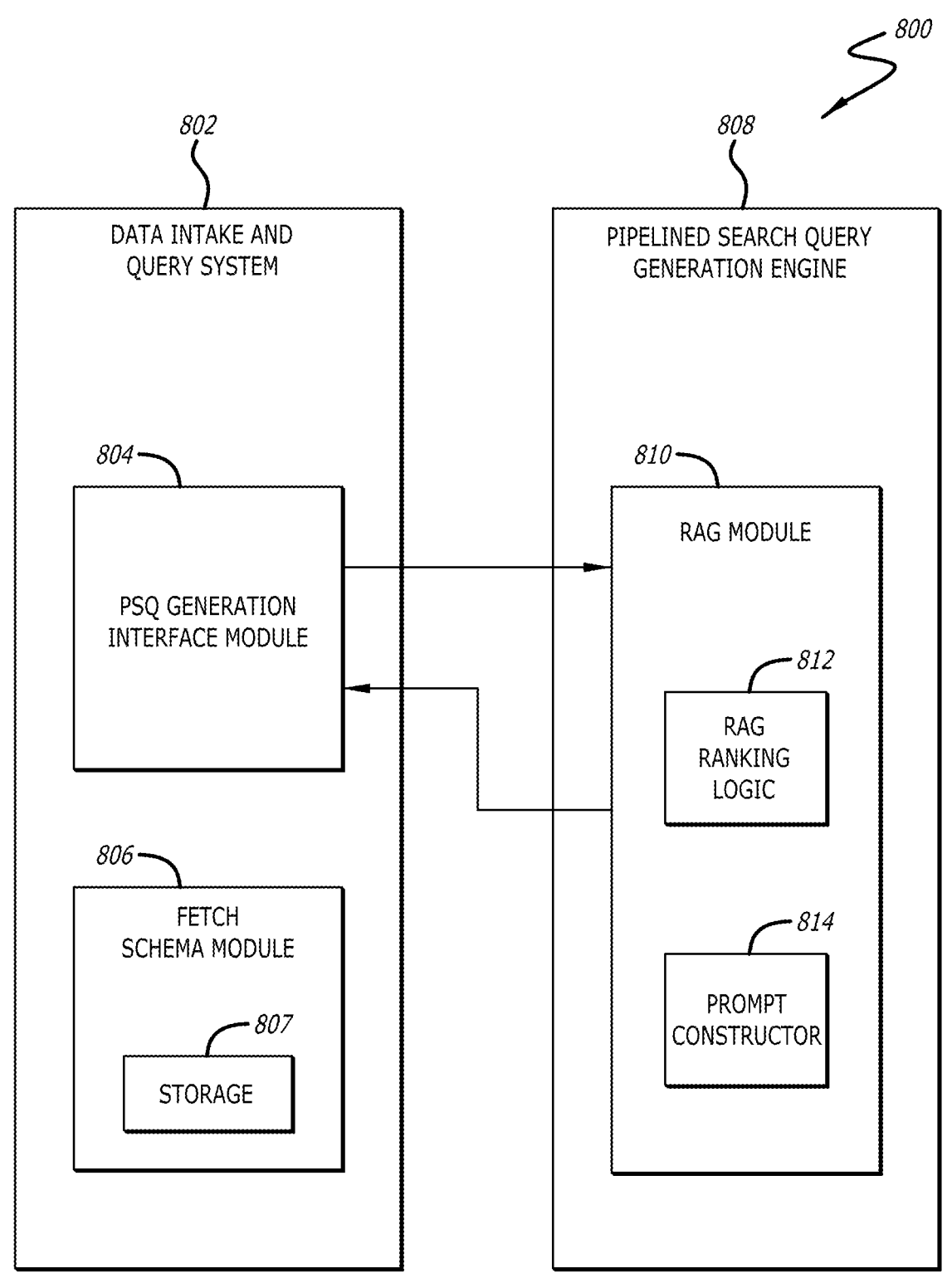
FIG. 8 is a logical diagram for deployment of a schema-based RAG ranking process according to an implementation of the disclosure.

Referring to FIG. 8, a logical diagram for deployment of a schema-based RAG ranking process is shown according to an implementation of the disclosure. In some particular examples in which the pipelined search query language is that of SPL referenced above, the SPL programming language includes many predefined source types. As discussed in further detail below, a source type identifies a data source and describes a possible data structure of event data produced by the data source. Predefined source types include specific defined fields for indexing data.

In some examples, when a user is associated with specific, predefined source types (e.g., the user's role as an information technology (IT) administrator is associated with specific source types not typically associated with our roles within an enterprise), it may be advantageous to provide a listing of the source types associated with the user and subsequently rank RAG examples, e.g., historical search queries, that include one or more of the predefined source types associated with the user or similar source types above RAG examples that do not include such. Additionally, it may be similarly advantageous to include source type information in an auto-generated prompt to be provided to an LLM, such as the prompt 215' of FIG. 1 that is provided to the LLM 234. Inclusion of the source type information associated with a user may be done through language included within the prompt 215/215' such as: "Our splunk source types include [source type1], [source type2], . . ."

FIG. 8 illustrates the RAG ranking process through logical diagrams that are configured to provide such functionality. The networked environment 800 illustrates a data intake and query system 802 communicatively coupled to a generation engine 808. The data intake and query system 802 is shown to include an interface module 804 that communicates with the generation engine 808 via one or more APIs. The data intake and query system 802 also includes fetch schema module 806 that is configured to obtain the schema associated with a user, extract the source types within the schema, and store the source types in storage 807.

The generation engine 808 is shown to include a RAG module 810 that is configured to receive a user's source type data. The RAG module 810 is shown to include a RAG ranking logic 812 that retrieves RAG data that includes the source types included in the user's source type data from a vector database 816. The RAG data may include {natural language, search query} pairings and/or historical search queries. As discussed throughout, the RAG data that may be retrieved for a particular user may be controlled according to RBAC enforcement. The RAG ranking logic 812 may then rank the retrieved RAG data based on the number of source types included in a RAG example and the source types included in the user's source type data.

The prompt constructor 814 may then append the ranked RAG data to an auto-generated prompt as discussed above. Additionally, the user's source type data may be appended to the prompt by the prompt constructor 814. The prompt may then be transmitted to an LLM for processing and the response provided to the data intake and query system 802 in a similar manner as other examples discussed herein.

Figure 9B:
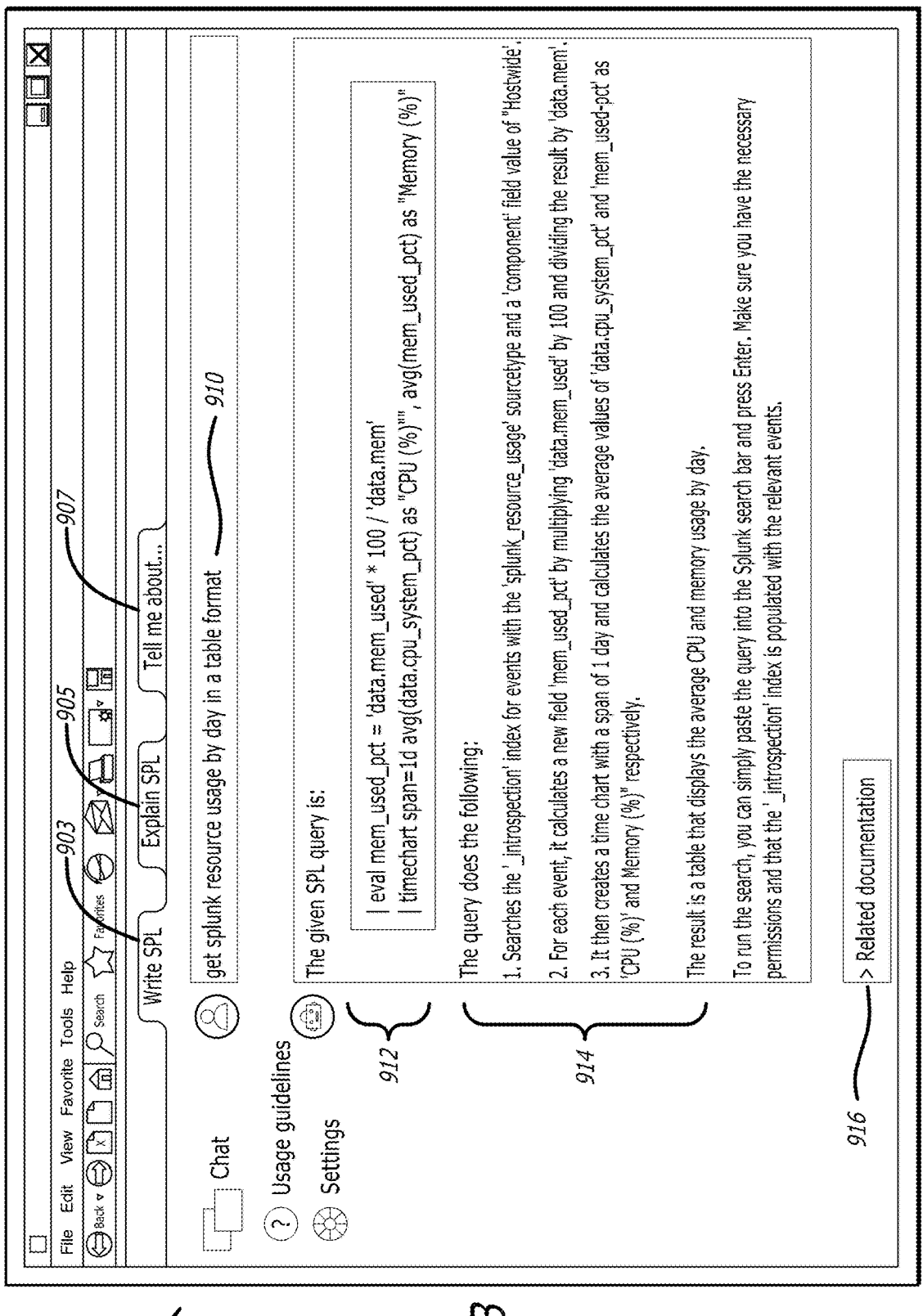

Referring to FIGS. 9A-9B, illustrative graphical user interfaces (GUIs) providing an example deployment of the pipelined search query generation logic module of FIG. 1 are shown according to an implementation of the disclosure. FIGS. 9A-9B may be understood as illustrating a chat interface that extends between the two drawings, e.g., the threat extends from FIGS. 9A-9B. FIG. 9A illustrates a chat interface 900 that is displayed on a display screen of a network device. The chat interface 900 is shown to include a first prompt 902 provided by a user and a first response that includes a first portion 904 being auto-generated software code in a structured query language, e.g., SPL, and a second portion 906 being a natural language description of the SPL of the first portion 904. Additionally, a user interface (UI) element 908 is shown that is configured to link to documentation related to the SPL of the first portion 904. The link may be to a website for example or trigger a download of a PDF document.

As noted above, the objective determinator 107 of FIG. 1, may determine the objective of a user-provided prompt for purposes of providing the prompt to a particular pipeline. In some instances, the objective determinator may obtain a URL associated with the prompt and utilize a keyword within the URL to determine the pipeline. Specifically, a set of tabs may be present within a webpage such as the tabs 903, 905, 907, where each tab is associated with a predefined objective, e.g., the tab 903 ("Write SPL") being associated with the objective to have a LLM auto-generate SPL. Each tab is associated with a unique keyword that is provided to the generation engine along with the prompt and the objective determinator may utilize the keyword to determine the objective of the prompt and direct the prompt to the corresponding pipeline. As further noted above, each pipeline may include a prompt constructor that retrieves a particular CoT template from a CoT database that may provide instructions, terminology, etc., relevant to a particular objective.

FIG. 9B illustrates an extension of the chat interface 900 as including a second prompt 910 provided by the user and a second response that includes a first portion 912 being auto-generated software code in a structured query language, e.g., SPL, and a second portion 914 being a natural language description of the SPL of the first portion 912. Additionally, a UI element 916 is shown that is configured to link to documentation related to the SPL of the first portion 912. The link may be to a website for example or trigger a download of a PDF document.

Referring now to FIG. 10, is a detailed flowchart illustrating an example process of operations for generating software code in a structured search query language through deployment of a large learning model (LLM) is shown according to an implementation of the disclosure. The example process 1000 can be implemented, for example, by a computing device that comprises a processor and a non-transitory computer-readable medium. The non-transitory computer readable medium can be storing instructions that, when executed by the processor, can cause the processor to perform the operations of the illustrated process 1000. Alternatively or additionally, the process 1000 can be implemented using a non-transitory computer-readable medium storing instructions that, when executed by one or more processors, cause the one or more processors to perform the operations of the process 1000 of FIG. 10.

The process 1000 begins with an operation of receiving a user-provided prompt, where the user-provided prompt is provided in natural language (block 1002). Natural language may refer to language used by humans in everyday communication, such as English, which is in contrast to a formal programming language having a specific syntax involving operators, commands, fields, function calls, etc. with example programming language including SPL, SQL, JAVA, Python, C++, etc. The process 1000 continues with an operations of identifying an objective of the user-provided prompt, and based on the objective, providing the user-provided prompt to a first operational pipeline of a plurality of operational pipelines, wherein each operational pipeline is associated with a unique prompt template (blocks 1004, 1006).

The first pipeline may then generate an auto-generated prompt based on a first unique prompt template of the first pipeline, which is distinct from the user-provided prompt, where the auto-generated prompt is then provided to a large language model (LLM) (blocks 1008, 1010). Once a response to the auto-generated prompt is received from the LLM, a graphical user interface (GUI) is generated that displays the response to the auto-generated prompt (block 1012, 1014).

In some examples, the response includes one or more pipelined search query statements that were auto-generated by the LLM. Additionally, a data intake and query system may execute the one or more pipelined search query statements that were auto-generated by the LLM, where the GUI displays results of execution of the one or more pipelined search query statements that were auto-generated by the LLM. An additional operation may include appending chat history data to the auto-generated prompt. In some instances, each unique prompt template is associated with a unique, corresponding chain of thought (CoT) template. The plurality of pipelines may include a retrieval augmented generation (RAG) pipeline configured to retrieve data to augment the user-provided prompt during generation of the auto-generated prompt. In some examples, identifying the objective of the user-provided prompt includes identifying a keyword provided with the user-provided prompt, and wherein the keyword is associated with the objective.

Referring now to FIG. 11, a detailed flowchart illustrating an example process of operations for performing a retrieval augmented generation (RAG) process corresponding to auto-generation of a prompt for generating software code in a structured search query language through deployment of a large learning model (LLM) is shown according to an implementation of the disclosure. The example process 1100 can be implemented, for example, by a computing device that comprises a processor and a non-transitory computer-readable medium. The non-transitory computer readable medium can be storing instructions that, when executed by the processor, can cause the processor to perform the operations of the illustrated process 1100. Alternatively or additionally, the process 1100 can be implemented using a non-transitory computer-readable medium storing instructions that, when executed by one or more processors, cause the one or more processors to perform the operations of the process 1100 of FIG. 11.

The process 1100 begins with an operation of receiving a user-provided prompt, where the user-provided prompt is provided in natural language (block 1102). The method 1100 subsequently includes performing a first retrieval augmented generation (RAG) process including retrieving first RAG data including {natural language, programming syntax} pairings from a vector database that have a first level of similarity with the user-provided prompt and performing a second RAG process including retrieving second RAG data including additional programming syntax examples from a vector database that have a second level of similarity with programming syntax of the {natural language, programming syntax} pairings retrieved during the first RAG process (blocks 1104, 1106).

Following the first and second RAG processes, the method 1100 includes generating an auto-generated prompt based on a first unique prompt template corresponding to a request for generation of programming code by a large language model (LLM), wherein the auto-generated prompt includes at least a portion of each of the first RAG data and the second RAG data (block 1108). The auto-generated prompt is provided to the LLM and a response to the auto-generated prompt is received from the LLM that includes the programming code generated by the LLM. A graphical user interface (GUI) may then be generated that displays the response to the auto-generated prompt.

The method 1100 may further comprise identifying an objective of the user-provided prompt, and based on the objective, providing the user-provided prompt to a first operational pipeline of a plurality of operational pipelines, and wherein the first operational pipeline corresponds to retrieving the first RAG data and the second RAG data. In some examples, each operational pipeline is associated with a unique prompt template, wherein each unique prompt template is associated with a unique, corresponding chain of thought (CoT) template, and wherein generating the auto-generated prompt is based on a first prompt template and a first CoT template.

Additionally, the method 1100 may further comprise executing, by a data intake and query system, the one or more pipelined search query statements that were auto-generated by the LLM, and wherein the GUI displays results of execution of the one or more pipelined search query statements that were auto-generated by the LLM. In some instances, the method 1100 further comprises performing a filtering process following the first RAG pipeline and the second RAG pipeline resulting in selection of a subset of the first RAG data and the second RAG data to be used in augmenting the auto-generated prompt.

Performing the first RAG process may include encoding the user-provided prompt with a first encoder resulting in a user-provided prompt embedding, and retrieving the first RAG data based on similarity measures between the user-provided prompt embedding and embeddings of the natural language of the {natural language, programming syntax} pairings stored in the vector database that have the first level of similarity with the user-provided prompt.

Additionally, performing the second RAG process maty include encoding, by a second encoder, the programming syntax of the {natural language, programming syntax} pairings retrieved during the first RAG process resulting in embeddings of the programming syntax, and retrieving the second RAG data being based on similarity measures between embeddings of the programming syntax and embeddings of additional programming syntax examples stored in the vector database that have the second level of similarity with the user-provided prompt.

Referring now to FIG. 12, a detailed flowchart illustrating an example process of operations for post-processing a response provided by a large learning model (LLM) that includes auto-generated software code in a structured search query language is shown according to an implementation of the disclosure. The example process 1200 can be implemented, for example, by a computing device that comprises a processor and a non-transitory computer-readable medium. The non-transitory computer readable medium can be storing instructions that, when executed by the processor, can cause the processor to perform the operations of the illustrated process 1200. Alternatively or additionally, the process 1200 can be implemented using a non-transitory computer-readable medium storing instructions that, when executed by one or more processors, cause the one or more processors to perform the operations of the process 1200 of FIG. 12.

The process 1200 begins with operations of receiving a user-provided prompt, wherein the user-provided prompt is provided in natural language and generating an auto-generated prompt based on the user-provided prompt and a first unique prompt template corresponding to a request for generation of programming code by a large language model (LLM) (blocks 1202, 1204). Additionally, the process 1200 includes operations of providing the auto-generated prompt to the LLM and receiving, by a post processing engine, a response to the auto-generated prompt from the LLM that includes the programming code generated by the LLM (blocks 1206, 1208).

Following receipt of the response, the process 1200 includes an operation of performing, by the post processing engine, a post processing including: (i) constructing an abstract syntax tree (AST) of terms of the programming code generated by the LLM, (ii) identifying whether a first term of AST is inconsistent with terms of a schema of the user, and (iii) when the first term of the AST is inconsistent with the terms of the schema, performing an error correction process resulting in replacement of a first term in the programming code generated by the LLM with a first replacement term of the schema, wherein the first term of the programming code generated by the LLM corresponds to the first term of AST (block 1210). An additional operation of the process 1200 may include generating a graphical user interface (GUI) that displays the response to the auto-generated prompt when the terms of the programming code generated by the LLM including any replacement terms are consistent with the terms of the schema (block 1212).

In some examples, the process 1200 may include an operation of constructing the AST includes tokenizing the terms of the programming code generated by the LLM and generating a hierarchical structure of the programming code generated by the LLM. In some instances, determining whether the terms of the AST are consistent or inconsistent with the schema includes encoding the terms of the pro-gramming code generated by the LLM to create embeddings of the terms of the terms of the programming code generated by the LLM and performing a comparison between the embeddings of the terms of the programming code generated by the LLM and embeddings of terms of the schema.

In some examples, replacing the first term in the pro-gramming code generated by the LLM with the first replace-ment term of the schema includes performing an edit dis-tance measure by computing edit distances between the first term of the programming code generated by the LLM and the terms of the schema and identifying the first replacement term as a term of the schema having a smallest edit distance. Further, in some instances, an edit distance represents a minimum number of single-character edits required to trans-form a first character string into a second character string, and wherein the single-character edits insertions, deletions, or substitutions.

The process 1200 may include operations of identifying an objective of the user-provided prompt and based on the objective, providing the user-provided prompt to a first operational pipeline of a plurality of operational pipelines, and wherein the first operational pipeline corresponds to retrieving the first RAG data and the second RAG data. In some examples, each operational pipeline is associated with a unique prompt template, wherein each unique prompt template is associated with a unique, corresponding chain of thought (CoT) template, and wherein generating the auto-generated prompt is based on a first prompt template and a first CoT template.

Entities that operate computing environments need infor-mation about their computing environments. For example, an entity may need to know the operating status of the various computing resources in the entity's computing envi-ronment, so that the entity can administer the environment, including performing configuration and maintenance, per-forming repairs or replacements, provisioning additional resources, removing unused resources, or addressing issues that may arise during operation of the computing environ-ment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the com-puting environment is operating efficiently and for its intended purpose.

Collection and analysis of the data from a computing environment can be performed by a data intake and query system such as is described herein. A data intake and query system can ingest and store data obtained from the compo-nents in a computing environment, and can enable an entity to search, analyze, and visualize the data. Through these and other capabilities, the data intake and query system can enable an entity to use the data for administration of the computing environment, to detect security issues, to under-stand how the computing environment is performing or being used, and/or to perform other analytics.

Figure 13:
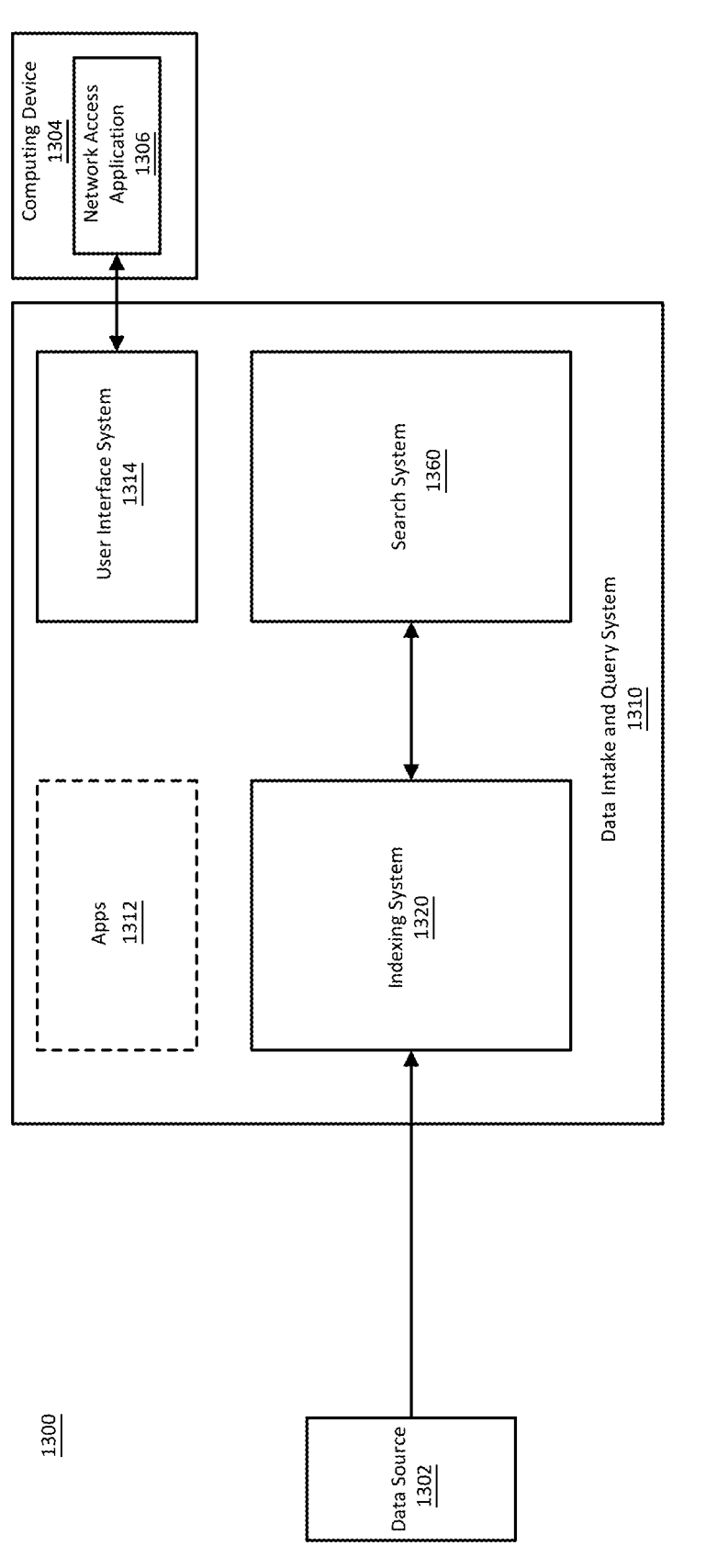
FIG. 13 is a block diagram illustrating an example computing environment that includes a data intake and query system according to an implementation of the disclosure.

FIG. 13 is a block diagram illustrating an example com-puting environment 1300 that includes a data intake and query system 1310. The data intake and query system 1310 obtains data from a data source 1302 in the computing environment 1300 and ingests the data using an indexing system 1320. A search system 1360 of the data intake and query system 1310 enables users to navigate the indexed data. Though drawn with separate boxes in FIG. 13, in some implementations the indexing system 1320 and the search system 1360 can have overlapping components. A comput-ing device 1304, running a network access application 1306, can communicate with the data intake and query system 1310 through a user interface system 1314 of the data intake and query system 1310. Using the computing device 1304, a user can perform various operations with respect to the data intake and query system 1310, such as administration of the data intake and query system 1310, management and generation of "knowledge objects," (user-defined entities for enriching data, such as saved searches, event types, tags, field extractions, lookups, reports, alerts, data models, work-flow actions, and fields), initiating of searches, and genera-tion of reports, among other operations. The data intake and query system 1310 can further optionally include apps 1312 that extend the search, analytics, and/or visualization capa-bilities of the data intake and query system 1310.

The data intake and query system 1310 can be imple-mented using program code that can be executed using a computing device. A computing device is an electronic device that has a memory for storing program code instruc-tions and a hardware processor for executing the instruc-tions. The computing device can further include other physi-cal components, such as a network interface or components for input and output. The program code for the data intake and query system 1310 can be stored on a non-transitory computer-readable medium, such as a magnetic or optical storage disk or a flash or solid-state memory, from which the program code can be loaded into the memory of the com-puting device for execution. "Non-transitory" means that the computer-readable medium can retain the program code while not under power, as opposed to volatile or "transitory" memory or media that requires power in order to retain data.

In various examples, the program code for the data intake and query system 1310 can be executed on a single com-puting device, or execution of the program code can be distributed over multiple computing devices. For example, the program code can include instructions for both indexing and search components (which may be part of the indexing system 1320 and/or the search system 1360, respectively), which can be executed on a computing device that also provides the data source 1302. As another example, the program code can be executed on one computing device, where execution of the program code provides both indexing and search components, while another copy of the program code executes on a second computing device that provides the data source 1302. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1302 of the computing environment 1300 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1302 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1320 obtains machine date from the data source 1302 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1320 does not require prior knowledge of the structure of incoming data (e.g., the indexing system 1320 does not need to be provided with a schema describing the data). Additionally, the indexing system 1320 retains a copy of the data as it was received by the indexing system 1320 such that the original data is always available for searching (e.g., no data is discarded, though, in some examples, the indexing system 1320 can be configured to do so).

The search system 1360 searches the data stored by the indexing 1320 system. As discussed in greater detail below, the search system 1360 enables users associated with the computing environment 1300 (and possibly also other users) to navigate the data, generate reports, and visualize search results in "dashboards" output using a graphical interface. Using the facilities of the search system 1360, users can obtain insights about the data, such as retrieving events from an index, calculating metrics, searching for specific conditions within a rolling time window, identifying patterns in the data, and predicting future trends, among other examples. To achieve greater efficiency, the search system 1360 can apply map-reduce methods to parallelize searching of large volumes of data. Additionally, because the original data is available, the search system 1360 can apply a schema to the data at search time. This allows different structures to be applied to the same data, or for the structure to be modified if or when the content of the data changes. Application of a schema at search time may be referred to herein as a late-binding schema technique.

The user interface system 1314 provides mechanisms through which users associated with the computing environment 1300 (and possibly others) can interact with the data intake and query system 1310. These interactions can include configuration, administration, and management of the indexing system 1320, initiation and/or scheduling of queries that are to be processed by the search system 1360, receipt or reporting of search results, and/or visualization of search results. The user interface system 1314 can include, for example, facilities to provide a command line interface or a web-based interface.

Users can access the user interface system 1314 using a computing device 1304 that communicates with data intake and query system 1310, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1300. For example, a person can log in as a particular user and, using the user's digital information, can access the data intake and query system 1310. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1304 can provide a human-machine interface through which a person can have a digital presence in the computing environment 1300 in the form of a user. The computing device 1304 is an electronic device having one or more processors and a memory capable of storing instructions for execution by the one or more processors. The computing device 1304 can further include input/output (I/O) hardware and a network interface. Applications executed by the computing device 1304 can include a network access application 1306, such as a web browser, which can use a network interface of the client computing device 1304 to communicate, over a network, with the user interface system 1314 of the data intake and query system 1310. The user interface system 1314 can use the network access application 1306 to generate user interfaces that enable a user to interact with the data intake and query system 1310. A web browser is one example of a network access application. A shell tool can also be used as a network access application. In some examples, the data intake and query system 1310 is an application executing on the computing device 1306. In such examples, the network access application 1306 can access the user interface system 1314 without going over a network.

The data intake and query system 1310 can optionally include apps 1312. An app of the data intake and query system 1310 is a collection of configurations, knowledge objects (a user-defined entity that enriches the data in the data intake and query system 1310), views, and dashboards that may provide additional functionality, different techniques for searching the data, and/or additional insights into the data. The data intake and query system 1310 can execute multiple applications simultaneously. Example applications include an information technology service intelligence application, which can monitor and analyze the performance and behavior of the computing environment 1300, and an enterprise security application, which can include content and searches to assist security analysts in diagnosing and acting on anomalous or malicious behavior in the computing environment 1300.

Though FIG. 13 illustrates only one data source, in practical implementations, the computing environment 1300 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1300, the data intake and query system 1310 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1300 can include on-prem and cloud-based computing resources, or only cloud-based resources. For example, an entity may have on-prem computing devices and a private cloud. In this example, the entity operates the data intake and query system 1310 and can choose to execute the data intake and query system 1310 on an on-prem computing device or in the cloud. In another example, a provider entity operates the data intake and query system 1310 in a public cloud and provides the functionality of the data intake and query system 1310 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1310. In some implementations, the entity providing the data intake and query system 1310 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1310, and a third entity can subscribe to the services of the second provider entity in order to use the functionality of the data intake and query system 1310. In this example, the data sources are associated with the third entity, users accessing the data intake and query system 1310 are associated with the third entity, and the analytics and insights provided by the data intake and query system 1310 are for purposes of the third entity's operations.

Figure 14:
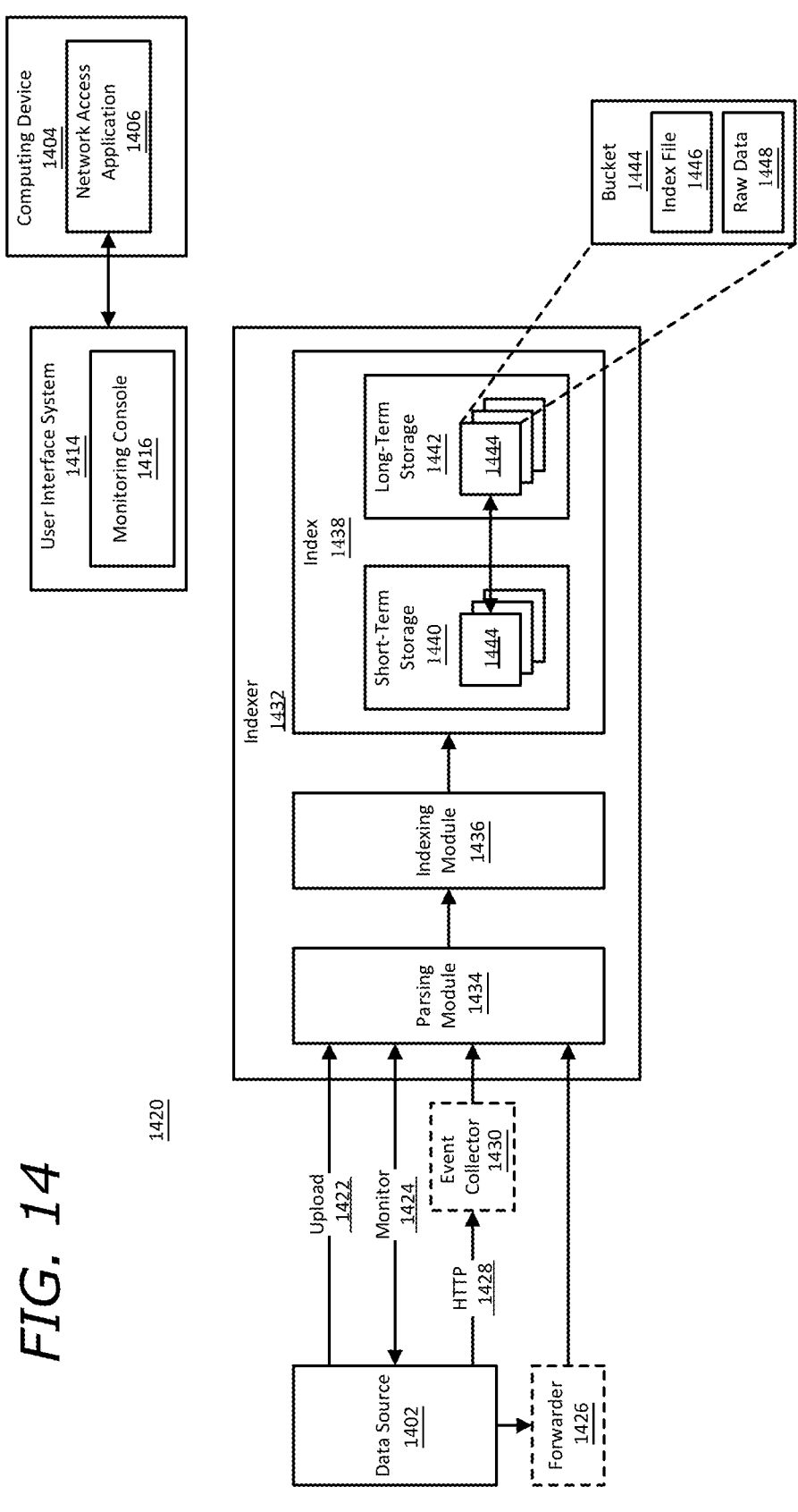
FIG. 14 is a block diagram illustrating in greater detail an example of an indexing system of a data intake and query system, such as the data intake and query system of FIG. 13 according to an implementation of the disclosure.

FIG. 14 is a block diagram illustrating in greater detail an example of an indexing system 1420 of a data intake and query system, such as the data intake and query system 1310 of FIG. 13. The indexing system 1420 of FIG. 14 uses various methods to obtain machine data from a data source 1402 and stores the data in an index 1438 of an indexer 1432. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1420 enables the data intake and query system to obtain the machine data produced by the data source 1402 and to store the data for searching and retrieval.

Users can administer the operations of the indexing system 1420 using a computing device 1404 that can access the indexing system 1420 through a user interface system 1414 of the data intake and query system. For example, the computing device 1404 can be executing a network access application 1406, such as a web browser or a terminal, through which a user can access a monitoring console 1416 provided by the user interface system 1414. The monitoring console 1416 can enable operations such as: identifying the data source 1402 for data ingestion; configuring the indexer 1432 to index the data from the data source 1432; configuring a data ingestion method; configuring, deploying, and managing clusters of indexers; and viewing the topology and performance of a deployment of the data intake and query system, among other operations. The operations performed by the indexing system 1420 may be referred to as "index time" operations, which are distinct from "search time" operations that are discussed further below.

The indexer 1432, which may be referred to herein as a data indexing component, coordinates and performs most of the index time operations. The indexer 1432 can be implemented using program code that can be executed on a computing device. The program code for the indexer 1432 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1432. In some implementations, the indexer 1432 executes on the computing device 1404 through which a user can access the indexing system 1420. In some implementations, the indexer 1432 executes on a different computing device than the illustrated computing device 1404.

The indexer 1432 may be executing on the computing device that also provides the data source 1402 or may be executing on a different computing device. In implementations wherein the indexer 1432 is on the same computing device as the data source 1402, the data produced by the data source 1402 may be referred to as "local data." In other implementations the data source 1402 is a component of a first computing device and the indexer 1432 executes on a second computing device that is different from the first computing device. In these implementations, the data produced by the data source 1402 may be referred to as "remote data." In some implementations, the first computing device is "on-prem" and in some implementations the first computing device is "in the cloud." In some implementations, the indexer 1432 executes on a computing device in the cloud and the operations of the indexer 1432 are provided as a service to entities that subscribe to the services provided by the data intake and query system.

For a given data produced by the data source 1402, the indexing system 1420 can be configured to use one of several methods to ingest the data into the indexer 1432. These methods include upload 1422, monitor 1424, using a forwarder 1426, or using HyperText Transfer Protocol (HTTP 1428) and an event collector 1430. These and other methods for data ingestion may be referred to as "getting data in" (GDI) methods.

Using the upload 1422 method, a user can specify a file for uploading into the indexer 1432. For example, the monitoring console 1416 can include commands or an interface through which the user can specify where the file is located (e.g., on which computing device and/or in which directory of a file system) and the name of the file. The file may be located at the data source 1402 or maybe on the computing device where the indexer 1432 is executing. Once uploading is initiated, the indexer 1432 processes the file, as discussed further below. Uploading is a manual process and occurs when instigated by a user. For automated data ingestion, the other ingestion methods are used.

The monitor 1424 method enables the indexing system 1402 to monitor the data source 1402 and continuously or periodically obtain data produced by the data source 1402 for ingestion by the indexer 1432. For example, using the monitoring console 1416, a user can specify a file or directory for monitoring. In this example, the indexing system 1402 can execute a monitoring process that detects whenever the file or directory is modified and causes the file or directory contents to be sent to the indexer 1432. As another example, a user can specify a network port for monitoring. In this example, a monitoring process can capture data received at or transmitting from the network port and cause the data to be sent to the indexer 1432. In various examples, monitoring can also be configured for data sources such as operating system event logs, performance data generated by an operating system, operating system registries, operating system directory services, and other data sources.

Monitoring is available when the data source 1402 is local to the indexer 1432 (e.g., the data source 1402 is on the computing device where the indexer 1432 is executing). Other data ingestion methods, including forwarding and the event collector 1430, can be used for either local or remote data sources.

A forwarder 1426, which may be referred to herein as a data forwarding component, is a software process that sends data from the data source 1402 to the indexer 1432. The forwarder 1426 can be implemented using program code that can be executed on the computer device that provides the data source 1402. A user launches the program code for the forwarder 1426 on the computing device that provides the data source 1402. The user can further configure the forwarder 1426, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1426 can provide various capabilities. For example, the forwarder 1426 can send the data unprocessed or can perform minimal processing on the data before sending the data to the indexer 1432. Minimal processing can include, for example, adding metadata tags to the data to identify a source, source type, and/or host, among other information, dividing the data into blocks, and/or applying a timestamp to the data. In some implementations, the forwarder 1426 can break the data into individual events (event generation is discussed further below) and send the events to a receiver. Other operations that the forwarder 1426 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1430 provides an alternate method for obtaining data from the data source 1402. The event collector 1430 enables data and application events to be sent to the indexer 1432 using HTTP 1428. The event collector 1430 can be implemented using program code that can be executing on a computing device. The program code may be a component of the data intake and query system or can be a standalone component that can be executed independently of the data intake and query system and operates in cooperation with the data intake and query system.

To use the event collector 1430, a user can, for example using the monitoring console 1416 or a similar interface provided by the user interface system 1414, enable the event collector 1430 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1402 as an alternative method to using a username and password for authentication.

To send data to the event collector 1430, the data source 1402 is supplied with a token and can then send HTTP 1428 requests to the event collector 1430. To send HTTP 1428 requests, the data source 1402 can be configured to use an HTTP client and/or to use logging libraries such as those supplied by Java, JavaScript, and NET libraries. An HTTP client enables the data source 1402 to send data to the event collector 1430 by supplying the data, and a Uniform Resource Identifier (URI) for the event collector 1430 to the HTTP client. The HTTP client then handles establishing a connection with the event collector 1430, transmitting a request containing the data, closing the connection, and receiving an acknowledgment if the event collector 1430 sends one. Logging libraries enable HTTP 1428 requests to the event collector 1430 to be generated directly by the data source. For example, an application can include or link a logging library, and through functionality provided by the logging library manage establishing a connection with the event collector 1430, transmitting a request, and receiving an acknowledgement.

An HTTP 1428 request to the event collector 1430 can contain a token, a channel identifier, event metadata, and/or event data. The token authenticates the request with the event collector 1430. The channel identifier, if available in the indexing system 1420, enables the event collector 1430 to segregate and keep separate data from different data sources. The event metadata can include one or more key-value pairs that describe the data source 1402 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1430 extracts events from HTTP 1428 requests and sends the events to the indexer 1432. The event collector 1430 can further be configured to send events to one or more indexers. Extracting the events can include associating any metadata in a request with the event or events included in the request. In these implementations, event generation by the indexer 1432 (discussed further below) is bypassed, and the indexer 1432 moves the events directly to indexing. In some implementations, the event collector 1430 extracts event data from a request and outputs the event data to the indexer 1432, and the indexer generates events from the event data. In some implementations, the event collector 1430 sends an acknowledgement message to the data source 1402 to indicate that the event collector 1430 has received a particular request form the data source 1402, and/or to indicate to the data source 1402 that events in the request have been added to an index.

The indexer 1432 ingests incoming data and transforms the data into searchable knowledge in the form of events. In the data intake and query system, an event is a single piece of data that represents activity of the component represented in FIG. 14 by the data source 1402. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1432 can include a parsing module 1434 and an indexing module 1436 for generating and storing the events. The parsing module 1434 and indexing module 1436 can be modular and pipelined, such that one component can be operating on a first set of data while the second component is simultaneously operating on a second sent of data. Additionally, the indexer 1432 may at any time have multiple instances of the parsing module 1434 and indexing module 1436, with each set of instances configured to simultaneously operate on data from the same data source or from different data sources. The parsing module 1434 and indexing module 1436 are illustrated in FIG. 14 to facilitate discussion, with the understanding that implementations with other components are possible to achieve the same functionality.

The parsing module 1434 determines information about incoming event data, where the information can be used to identify events within the event data. For example, the parsing module 1434 can associate a source type with the event data. A source type identifies the data source 1402 and describes a possible data structure of event data produced by the data source 1402. For example, the source type can indicate which fields to expect in events generated at the data source 1402 and the keys for the values in the fields, and possibly other information such as sizes of fields, an order of the fields, a field separator, and so on. The source type of the data source 1402 can be specified when the data source 1402 is configured as a source of event data. Alternatively, the parsing module 1434 can determine the source type from the event data, for example from an event field in the event data or using machine learning techniques applied to the event data.

Other information that the parsing module 1434 can determine includes timestamps. In some cases, an event includes a timestamp as a field, and the timestamp indicates a point in time when the action represented by the event occurred or was recorded by the data source 1402 as event data. In these cases, the parsing module 1434 may be able to determine from the source type associated with the event data that the timestamps can be extracted from the events themselves. In some cases, an event does not include a timestamp and the parsing module 1434 determines a timestamp for the event, for example from a name associated with the event data from the data source 1402 (e.g., a file name when the event data is in the form of a file) or a time associated with the event data (e.g., a file modification time). As another example, when the parsing module 1434 is not able to determine a timestamp from the event data, the parsing module 1434 may use the time at which it is indexing the event data. As another example, the parsing module 1434 can use a user-configured rule to determine the timestamps to associate with events.

The parsing module 1434 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1434 may be able to determine event boundaries from the source type associated with the event data, for example from a data structure indicated by the source type. In some implementations, a user can configure rules the parsing module 1434 can use to identify event boundaries.

The parsing module 1434 can further extract data from events and possibly also perform transformations on the events. For example, the parsing module 1434 can extract a set of fields (key-value pairs) for each event, such as a host or hostname, source or source name, and/or source type. The parsing module 1434 may extract certain fields by default or based on a user configuration. Alternatively or additionally, the parsing module 1434 may add fields to events, such as a source type or a user-configured field. As another example of a transformation, the parsing module 1434 can anonymize fields in events to mask sensitive information, such as social security numbers or account numbers. Anonymizing fields can include changing or replacing values of specific fields. The parsing component 1434 can further perform user-configured transformations.

The parsing module 1434 outputs the results of processing incoming event data to the indexing module 1436, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1432 can be configured to identify searchable segments that are parts of fields, searchable segments that are entire fields, or both. The parsing module 1434 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1446, to find event data that matches a search query. In some implementations, segmentation can alternatively be performed by the forwarder 1426. Segmentation can also be disabled, in which case the indexer 1432 will not build a lexicon for the event data. When segmentation is disabled, the search system searches the event data directly.

Building index data structures generates the index 1438. The index 1438 is a storage data structure on a storage device (e.g., a disk drive or other physical device for storing digital data). The storage device may be a component of the computing device on which the indexer 1432 is operating (referred to herein as local storage) or may be a component of a different computing device (referred to herein as remote storage) that the indexer 1438 has access to over a network. The indexer 1432 can manage more than one index and can manage indexes of different types. For example, the indexer 1432 can manage event indexes, which impose minimal structure on stored data and can accommodate any type of data. As another example, the indexer 1432 can manage metrics indexes, which use a highly structured format to handle the higher volume and lower latency demands associated with metrics data.

The indexing module 1436 organizes files in the index 1438 in directories referred to as buckets. The files in a bucket 1444 can include raw data files, index files, and possibly also other metadata files. As used herein, "raw data" means data as when the data was produced by the data source 1402, without alteration to the format or content. As noted previously, the parsing component 1434 may add fields to event data and/or perform transformations on fields in the event data. Event data that has been altered in this way is referred to herein as enriched data. A raw data file 1448 can include enriched data, in addition to or instead of raw data. The raw data file 1448 may be compressed to reduce disk usage. An index file 1446, which may also be referred to herein as a "time-series index" or tsidx file, contains metadata that the indexer 1432 can use to search a corresponding raw data file 1448. As noted above, the metadata in the index file 1446 includes a lexicon of the event data, which associates each unique keyword in the event data with a reference to the location of event data within the raw data file 1448. The keyword data in the index file 1446 may also be referred to as an inverted index. In various implementations, the data intake and query system can use index files for other purposes, such as to store data summarizations that can be used to accelerate searches.

A bucket 1444 includes event data for a particular range of time. The indexing module 1436 arranges buckets in the index 1438 according to the age of the buckets, such that buckets for more recent ranges of time are stored in short-term storage 1440 and buckets for less recent ranges of time are stored in long-term storage 1442. Short-term storage 1440 may be faster to access while long-term storage 1442 may be slower to access. Buckets may be moves from short-term storage 1440 to long-term storage 1442 according to a configurable data retention policy, which can indicate at what point in time a bucket is old enough to be moved.

A bucket's location in short-term storage 1440 or long-term storage 1442 can also be indicated by the bucket's status. As an example, a bucket's status can be "hot," "warm," "cold," "frozen," or "thawed." In this example, hot bucket is one to which the indexer 1432 is writing data and the bucket becomes a warm bucket when the index 1432 stops writing data to it. In this example, both hot and warm buckets reside in short-term storage 1440. Continuing this example, when a warm bucket is moved to long-term storage 1442, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1420 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1420 through the monitoring console 1416 provided by the user interface system 1414. Using the monitoring console 1416, the user can configure and monitor an index cluster, and see information such as disk usage by an index, volume usage by an indexer, index and volume size over time, data age, statistics for bucket types, and bucket settings, among other information.

FIG. 15 is a block diagram illustrating in greater detail an example of the search system 1560 of a data intake and query system, such as the data intake and query system 1310 of FIG. 13. The search system 1560 of FIG. 15 issues a query 1566 to a search head 1562, which sends the query 1566 to a search peer 1564. Using a map process 1570, the search peer 1564 searches the appropriate index 1538 for events identified by the query 1566 and sends events 1578 so identified back to the search head 1562. Using a reduce process 1582, the search head 1562 processes the events 1578 and produces results 1568 to respond to the query 1566. The results 1568 can provide useful insights about the data stored in the index 1538. These insights can aid in the administration of information technology systems, in security analysis of information technology systems, and/or in analysis of the development environment provided by information technology systems.

The query 1566 that initiates a search is produced by a search and reporting app 1516 that is available through the user interface system 1514 of the data intake and query system. Using a network access application 1506 executing on a computing device 1504, a user can input the query 1566 into a search field provided by the search and reporting app 1516. Alternatively or additionally, the search and reporting app 1516 can include pre-configured queries or stored queries that can be activated by the user. In some cases, the search and reporting app 1516 initiates the query 1566 when the user enters the query 1566. In these cases, the query 1566 maybe referred to as an "ad-hoc" query. In some cases, the search and reporting app 1516 initiates the query 1566 based on a schedule. For example, the search and reporting app 1516 can be configured to execute the query 1566 once per hour, once per day, at a specific time, on a specific date, or at some other time that can be specified by a date, time, and/or frequency. These types of queries maybe referred to as scheduled queries.

The query 1566 is specified using a search processing language. The search processing language includes commands or search terms that the search peer 1564 will use to identify events to return in the search results 1568. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1566 to include sequential commands, where a subsequent command may operate on the results of a prior command. As an example, sequential commands may be separated in the query 1566 by a vertical line ("|" or "pipe") symbol.

In addition to one or more search commands, the query 1566 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1566 occurs in two broad phases: a map phase 1550 and a reduce phase 1552. The map phase 1550 takes place across one or more search peers. In the map phase 1550, the search peers locate event data that matches the search terms in the search query 1566 and sorts the event data into field-value pairs. When the map phase 1550 is complete, the search peers send events that they have found to one or more search heads for the reduce phase 1552. During the reduce phase 1552, the search heads process the events through commands in the search query 1566 and aggregate the events to produce the final search results 1568.

A search head, such as the search head 1562 illustrated in FIG. 15, is a component of the search system 1560 that manages searches. The search head 1562, which may also be referred to herein as a search management component, can be implemented using program code that can be executed on a computing device. The program code for the search head 1562 can be stored on a non-transitory computer-readable medium and from this medium can be loaded or copied to the memory of a computing device. One or more hardware processors of the computing device can read the program code from the memory and execute the program code in order to implement the operations of the search head 1562.

Upon receiving the search query 1566, the search head 1562 directs the query 1566 to one or more search peers, such as the search peer 1564 illustrated in FIG. 15. "Search peer" is an alternate name for "indexer" and a search peer may be largely similar to the indexer described previously. The search peer 1564 may be referred to as a "peer node" when the search peer 1564 is part of an indexer cluster. The search peer 1564, which may also be referred to as a search execution component, can be implemented using program code that can be executed on a computing device. In some implementations, one set of program code implements both the search head 1562 and the search peer 1564 such that the search head 1562 and the search peer 1564 form one component. In some implementations, the search head 1562 is an independent piece of code that performs searching and no indexing functionality. In these implementations, the search head 1562 may be referred to as a dedicated search head.

The search head 1562 may consider multiple criteria when determining whether to send the query 1566 to the particular search peer 1564. For example, the search system 1560 may be configured to include multiple search peers that each have duplicative copies of at least some of the event data and are implanted using different hardware resources q. In this example, the sending the search query 1566 to more than one search peer allows the search system 1560 to distribute the search workload across different hardware resources. As another example, search system 1560 may include different search peers for different purposes (e.g., one has an index storing a first type of data or from a first data source while a second has an index storing a second type of data or from a second data source). In this example, the search query 1566 may specify which indexes to search, and the search head 1562 will send the query 1566 to the search peers that have those indexes.

To identify events 1578 to send back to the search head 1562, the search peer 1564 performs a map process 1570 to obtain event data 1574 from the index 1538 that is maintained by the search peer 1564. During a first phase of the map process 1570, the search peer 1564 identifies buckets that have events that are described by the time indicator in the search query 1566. As noted above, a bucket contains events whose timestamps fall within a particular range of time. For each bucket 1544 whose events can be described by the time indicator, during a second phase of the map process 1570, the search peer 1564 performs a keyword search 1574 using search terms specified in the search query 1566. The search terms can be one or more of keywords, phrases, fields, Boolean expressions, and/or comparison expressions that in combination describe events being searched for. When segmentation is enabled at index time, the search peer 1564 performs the keyword search 1572 on the bucket's index file 1546. As noted previously, the index file 1546 includes a lexicon of the searchable terms in the events stored in the bucket's raw data 1548 file. The keyword search 1572 searches the lexicon for searchable terms that correspond to one or more of the search terms in the query 1566. As also noted above, the lexicon incudes, for each searchable term, a reference to each location in the raw data 1548 file where the searchable term can be found. Thus, when the keyword search identifies a searchable term in the index file 1546 that matches a search term in the query 1566, the search peer 1564 can use the location references to extract from the raw data 1548 file the event data 1574 for each event that include the searchable term.

In cases where segmentation was disabled at index time, the search peer 1564 performs the keyword search 1572 directly on the raw data 1548 file. To search the raw data 1548, the search peer 1564 may identify searchable segments in events in a similar manner as when the data was indexed. Thus, depending on how the search peer 1564 is configured, the search peer 1564 may look at event fields and/or parts of event fields to determine whether an event matches the query 1566. Any matching events can be added to the event data 1574 read from the raw data 1548 file. The search peer 1564 can further be configured to enable segmentation at search time, so that searching of the index 1538 causes the search peer 1564 to build a lexicon in the index file 1546.

The event data 1574 obtained from the raw data 1548 file includes the full text of each event found by the keyword search 1572. During a third phase of the map process 1570, the search peer 1564 performs event processing 1576 on the event data 1574, with the steps performed being determined by the configuration of the search peer 1564 and/or commands in the search query 1566. For example, the search peer 1564 can be configured to perform field discovery and field extraction. Field discovery is a process by which the search peer 1564 identifies and extracts key-value pairs from the events in the event data 1574. The search peer 1564 can, for example, be configured to automatically extract the first 100 fields (or another number of fields) in the event data 1574 that can be identified as key-value pairs. As another example, the search peer 1564 can extract any fields explicitly mentioned in the search query 1566. The search peer 1564 can, alternatively or additionally, be configured with particular field extractions to perform.

Other examples of steps that can be performed during event processing 1576 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1564 sends processed events 1578 to the search head 1562, which performs a reduce process 1580. The reduce process 1580 potentially receives events from multiple search peers and performs various results processing 1582 steps on the received events. The results processing 1582 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1582 can further include applying commands from the search query 1566 to the events. The query 1566 can include, for example, commands for evaluating and/or manipulating fields (e.g., to generate new fields from existing fields or parse fields that have more than one value). As another example, the query 1566 can include commands for calculating statistics over the events, such as counts of the occurrences of fields, or sums, averages, ranges, and so on, of field values. As another example, the query 1566 can include commands for generating statistical values for purposes of generating charts of graphs of the events.

The reduce process 1580 outputs the events found by the search query 1566, as well as information about the events. The search head 1562 transmits the events and the information about the events as search results 1568, which are received by the search and reporting app 1516. The search and reporting app 1516 can generate visual interfaces for viewing the search results 1568. The search and reporting app 1516 can, for example, output visual interfaces for the network access application 1506 running on a computing device 1504 to generate.

The visual interfaces can include various visualizations of the search results 1568, such as tables, line or area charts, Chloropleth maps, or single values. The search and reporting app 1516 can organize the visualizations into a dashboard, where the dashboard includes a panel for each visualization. A dashboard can thus include, for example, a panel listing the raw event data for the events in the search results 1568, a panel listing fields extracted at index time and/or found through field discovery along with statistics for those fields, and/or a timeline chart indicating how many events occurred at specific points in time (as indicated by the timestamps associated with each event). In various implementations, the search and reporting app 1516 can provide one or more default dashboards. Alternatively or additionally, the search and reporting app 1516 can include functionality that enables a user to configure custom dashboards.

The search and reporting app 1516 can also enable further investigation into the events in the search results 1516. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1566. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 16:
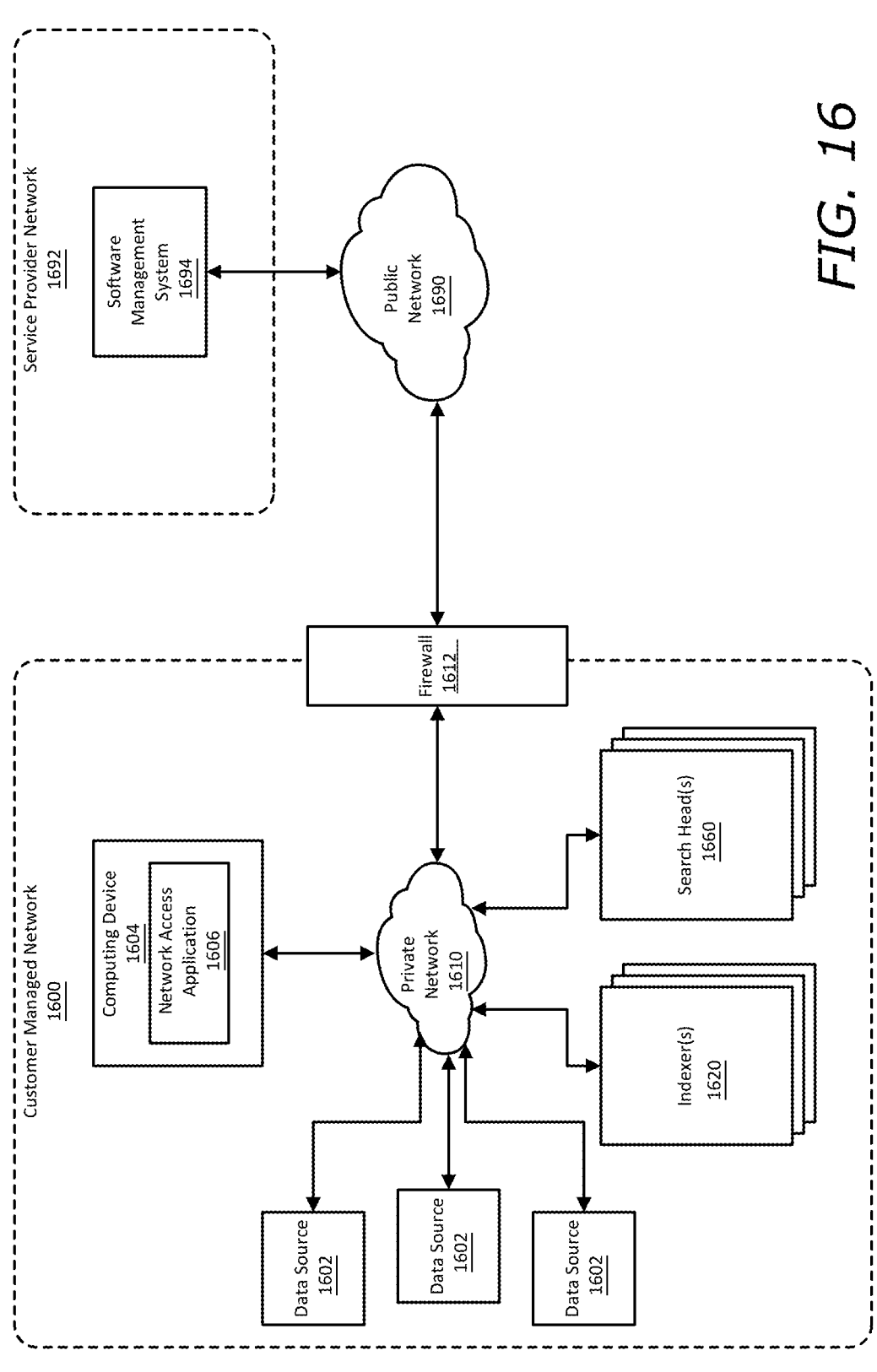
FIG. 16 illustrates an example of a self-managed network 1600 that includes a data intake and query system according to an implementation of the disclosure.

FIG. 16 illustrates an example of a self-managed network 1600 that includes a data intake and query system. "Self-managed" in this instance means that the entity that is operating the self-managed network 1600 configures, administers, maintains, and/or operates the data intake and query system using its own compute resources and people. Further, the self-managed network 1600 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1600 is located within the customer's on-prem environment, such as in the entity's data center, the operation and management of the self-managed network 1600, including of the resources in the self-managed network 1600, is under the control of the entity. For example, administrative personnel of the entity have complete access to and control over the configuration, management, and security of the self-managed network 1600 and its resources.

The self-managed network 1600 can execute one or more instances of the data intake and query system. An instance of the data intake and query system may be executed by one or more computing devices that are part of the self-managed network 1600. A data intake and query system instance can comprise an indexing system and a search system, where the indexing system includes one or more indexers 1620 and the search system includes one or more search heads 1660.

As depicted in FIG. 16, the self-managed network 1600 can include one or more data sources 1602. Data received from these data sources may be processed by an instance of the data intake and query system within self-managed network 1600. The data sources 1602 and the data intake and query system instance can be communicatively coupled to each other via a private network 1610.

Users associated with the entity can interact with and avail themselves of the functions performed by a data intake and query system instance using computing devices. As depicted in FIG. 16, a computing device 1604 can execute a network access application 1606 (e.g., a web browser), that can communicate with the data intake and query system instance and with data sources 1602 via the private network 1610. Using the computing device 1604, a user can perform various operations with respect to the data intake and query system, such as management and administration of the data intake and query system, generation of knowledge objects, and other functions. Results generated from processing performed by the data intake and query system instance may be communicated to the computing device 1604 and output to the user via an output system (e.g., a screen) of the computing device 1604.

The self-managed network 1600 can also be connected to other networks that are outside the entity's on-premise environment/network, such as networks outside the entity's data center. Connectivity to these other external networks is controlled and regulated through one or more layers of security provided by the self-managed network 1600. One or more of these security layers can be implemented using firewalls 1612. The firewalls 1612 form a layer of security around the self-managed network 1600 and regulate the transmission of traffic from the self-managed network 1600 to the other networks and from these other networks to the self-managed network 1600.

Networks external to the self-managed network can include various types of networks including public networks 1690, other private networks, and/or cloud networks provided by one or more cloud service providers. An example of a public network 1690 is the Internet. In the example depicted in FIG. 16, the self-managed network 1600 is connected to a service provider network 1692 provided by a cloud service provider via the public network 1690.

In some implementations, resources provided by a cloud service provider may be used to facilitate the configuration and management of resources within the self-managed network 1600. For example, configuration and management of a data intake and query system instance in the self-managed network 1600 may be facilitated by a software management system 1694 operating in the service provider network 1692. There are various ways in which the software management system 1694 can facilitate the configuration and management of a data intake and query system instance within the self-managed network 1600. As one example, the software management system 1694 may facilitate the download of software including software updates for the data intake and query system. In this example, the software management system 1694 may store information indicative of the versions of the various data intake and query system instances present in the self-managed network 1600. When a software patch or upgrade is available for an instance, the software management system 1694 may inform the self-managed network 1600 of the patch or upgrade. This can be done via messages communicated from the software management system 1694 to the self-managed network 1600.

The software management system 1694 may also provide simplified ways for the patches and/or upgrades to be downloaded and applied to the self-managed network 1600. For example, a message communicated from the software management system 1694 to the self-managed network 1600 regarding a software upgrade may include a Uniform Resource Identifier (URI) that can be used by a system administrator of the self-managed network 1600 to download the upgrade to the self-managed network 1600. In this manner, management resources provided by a cloud service provider using the service provider network 1692 and which are located outside the self-managed network 1600 can be used to facilitate the configuration and management of one or more resources within the entity's on-prem environment. In some implementations, the download of the upgrades and patches may be automated, whereby the software management system 1694 is authorized to, upon determining that a patch is applicable to a data intake and query system instance inside the self-managed network 1600, automatically communicate the upgrade or patch to self-managed network 1600 and cause it to be installed within self-managed network 1600.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/ steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:
1. A computer-implemented method, comprising:
receiving a user-provided prompt, wherein the user-provided prompt is provided in natural language;
generating an auto-generated prompt based on the user-provided prompt and a first unique prompt template corresponding to a request for generation of programming code by a large language model (LLM);
providing the auto-generated prompt to the LLM;

receiving, by a post processing engine, a response to the auto-generated prompt from the LLM that includes the programming code generated by the LLM;
performing, by the post processing engine, a post processing including:
(i) constructing an abstract syntax tree (AST) of terms of the programming code generated by the LLM,
(ii) identifying whether a first term of AST is inconsistent with terms of a schema of the user, and
(iii) when the first term of the AST is inconsistent with the terms of the schema, performing an error correction process resulting in replacement of a first term in the programming code generated by the LLM with a first replacement term of the schema, wherein the first term of the programming code generated by the LLM corresponds to the first term of AST; and
generating a graphical user interface (GUI) that displays the response to the auto-generated prompt when the terms of the programming code generated by the LLM including any replacement terms are consistent with the terms of the schema.
2. The computer-implemented method of claim 1, wherein constructing the AST includes tokenizing the terms of the programming code generated by the LLM and generating a hierarchical structure of the programming code generated by the LLM.
3. The computer-implemented method of claim 1, wherein determining whether the terms of the AST are consistent or inconsistent with the schema includes encoding the terms of the programming code generated by the LLM to create embeddings of the terms of the terms of the programming code generated by the LLM and performing a comparison between the embeddings of the terms of the programming code generated by the LLM and embeddings of terms of the schema.
4. The computer-implemented method of claim 1, wherein replacing the first term in the programming code generated by the LLM with the first replacement term of the schema includes performing an edit distance measure by computing edit distances between the first term of the programming code generated by the LLM and the terms of the schema and identifying the first replacement term as a term of the schema having a smallest edit distance.
5. The computer-implemented method of claim 4, wherein an edit distance represents a minimum number of single-character edits required to transform a first character string into a second character string, and wherein the single-character edits insertions, deletions, or substitutions.
6. The computer-implemented method of claim 1, further comprising:
identifying an objective of the user-provided prompt; and
based on the objective, providing the user-provided prompt to a first operational pipeline of a plurality of operational pipelines, and wherein the first operational pipeline corresponds to retrieving the first RAG data and the second RAG data.
7. The computer-implemented method of claim 6, wherein each operational pipeline is associated with a unique prompt template, wherein each unique prompt template is associated with a unique, corresponding chain of thought (CoT) template, and wherein generating the auto-generated prompt is based on a first prompt template and a first CoT template.
8. A computing device, comprising:
a processor; and a non-transitory computer-readable medium having stored thereon instructions that, when executed by the processor, cause the processor to perform operations including:

receiving a user-provided prompt, wherein the user-provided prompt is provided in natural language;

generating an auto-generated prompt based on the user-provided prompt and a first unique prompt template corresponding to a request for generation of programming code by a large language model (LLM);

providing the auto-generated prompt to the LLM;

receiving, by a post processing engine, a response to the auto-generated prompt from the LLM that includes the programming code generated by the LLM;

performing, by the post processing engine, a post processing including:

(i) constructing an abstract syntax tree (AST) of terms of the programming code generated by the LLM, (ii) identifying whether a first term of AST is inconsistent with terms of a schema of the user, and (iii) when the first term of the AST is inconsistent with the terms of the schema, performing an error correction process resulting in replacement of a first term in the programming code generated by the LLM with a first replacement term of the schema, wherein the first term of the programming code generated by the LLM corresponds to the first term of AST; and generating a graphical user interface (GUI) that displays the response to the auto-generated prompt when the terms of the programming code generated by the LLM including any replacement terms are consistent with the terms of the schema.

9. The computing device of claim 8, wherein constructing the AST includes tokenizing the terms of the programming code generated by the LLM and generating a hierarchical structure of the programming code generated by the LLM.

10. The computing device of claim 8, wherein determining whether the terms of the AST are consistent or inconsistent with the schema includes encoding the terms of the programming code generated by the LLM to create embeddings of the terms of the terms of the programming code generated by the LLM and performing a comparison between the embeddings of the terms of the programming code generated by the LLM and embeddings of terms of the schema.

11. The computing device of claim 8, wherein replacing the first term in the programming code generated by the LLM with the first replacement term of the schema includes performing an edit distance measure by computing edit distances between the first term of the programming code generated by the LLM and the terms of the schema and identifying the first replacement term as a term of the schema having a smallest edit distance.

12. The computing device of claim 11, wherein an edit distance represents a minimum number of single-character edits required to transform a first character string into a second character string, and wherein the single-character edits insertions, deletions, or substitutions.

13. The computing device of claim 8, wherein the operations further comprise:

identifying an objective of the user-provided prompt; and based on the objective, providing the user-provided prompt to a first operational pipeline of a plurality of operational pipelines, and wherein the first operational pipeline corresponds to retrieving the first RAG data and the second RAG data.

14. The computing device of claim 13, wherein each operational pipeline is associated with a unique prompt template, wherein each unique prompt template is associated with a unique, corresponding chain of thought (CoT) template, and wherein generating the auto-generated prompt is based on a first prompt template and a first CoT template.

15. A non-transitory computer-readable medium having stored thereon instructions that, when executed by one or more processors, cause the one or more processor to perform operations including:

receiving a user-provided prompt, wherein the user-provided prompt is provided in natural language;

generating an auto-generated prompt based on the user-provided prompt and a first unique prompt template corresponding to a request for generation of programming code by a large language model (LLM);

providing the auto-generated prompt to the LLM;

receiving, by a post processing engine, a response to the auto-generated prompt from the LLM that includes the programming code generated by the LLM;

performing, by the post processing engine, a post processing including:

(i) constructing an abstract syntax tree (AST) of terms of the programming code generated by the LLM, (ii) identifying whether a first term of AST is inconsistent with terms of a schema of the user, and (iii) when the first term of the AST is inconsistent with the terms of the schema, performing an error correction process resulting in replacement of a first term in the programming code generated by the LLM with a first replacement term of the schema, wherein the first term of the programming code generated by the LLM corresponds to the first term of AST; and generating a graphical user interface (GUI) that displays the response to the auto-generated prompt when the terms of the programming code generated by the LLM including any replacement terms are consistent with the terms of the schema.

16. The non-transitory computer-readable medium of claim 15, wherein constructing the AST includes tokenizing the terms of the programming code generated by the LLM and generating a hierarchical structure of the programming code generated by the LLM.

17. The non-transitory computer-readable medium of claim 15, wherein determining whether the terms of the AST are consistent or inconsistent with the schema includes encoding the terms of the programming code generated by the LLM to create embeddings of the terms of the terms of the programming code generated by the LLM and performing a comparison between the embeddings of the terms of the programming code generated by the LLM and embeddings of terms of the schema.

18. The non-transitory computer-readable medium of claim 15, wherein replacing the first term in the programming code generated by the LLM with the first replacement term of the schema includes performing an edit distance measure by computing edit distances between the first term of the programming code generated by the LLM and the terms of the schema and identifying the first replacement term as a term of the schema having a smallest edit distance.

19. The non-transitory computer-readable medium of claim 18, wherein an edit distance represents a minimum number of single-character edits required to transform a first character string into a second character string, and wherein the single-character edits insertions, deletions, or substitutions.

20. The non-transitory computer-readable medium of claim 15, wherein the operations further comprise:

identifying an objective of the user-provided prompt; and based on the objective, providing the user-provided prompt to a first operational pipeline of a plurality of operational pipelines, and wherein the first operational pipeline corresponds to retrieving the first RAG data and the second RAG data, and wherein each operational pipeline is associated with a unique prompt template, wherein each unique prompt template is associated with a unique, corresponding chain of thought (CoT) template, and wherein generating the auto-generated prompt is based on a first prompt template and a first CoT template.

* * * * *